United States Patent
Horvitz et al.

(10) Patent No.: US 8,707,204 B2
(45) Date of Patent: Apr. 22, 2014

(54) EXPLODED VIEWS FOR PROVIDING RICH REGULARIZED GEOMETRIC TRANSFORMATIONS AND INTERACTION MODELS ON CONTENT FOR VIEWING, PREVIEWING, AND INTERACTING WITH DOCUMENTS, PROJECTS, AND TASKS

(75) Inventors: Eric J. Horvitz, Kirkland, WA (US); Lili Cheng, Bellevue, WA (US); Jia-Chi Wu, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 733 days.

(21) Appl. No.: 12/258,809

(22) Filed: Oct. 27, 2008

(65) Prior Publication Data
US 2009/0064024 A1    Mar. 5, 2009

Related U.S. Application Data

(62) Division of application No. 10/609,890, filed on Jun. 30, 2003, now Pat. No. 7,444,598.

(51) Int. Cl.
*G06K 3/00*    (2006.01)

(52) U.S. Cl.
USPC ........................................... 715/804; 715/808

(58) Field of Classification Search
USPC ......... 715/205, 712–713, 744–747, 734–736, 715/763, 766–767, 802–805, 821, 853–855
See application file for complete search history.

(56) References Cited

U.S. PATENT DOCUMENTS

| 5,493,692 A | 2/1996 | Theimer et al. |
| 5,544,321 A | 8/1996 | Theimer et al. |
| 5,555,376 A | 9/1996 | Theimer et al. |

(Continued)

FOREIGN PATENT DOCUMENTS

WO    WO9800787    1/1998

OTHER PUBLICATIONS

Office action for U.S. Appl. No. 12/258,802, mailed on May 20, 2013, Horvitz et al., "Exploded Views for Providing Rich Regularized Geometric Transformations and Interaction Models on Content for Viewing, Previewing, and Interacting With Documents, Projects, and Tasks", 14 pages.

(Continued)

*Primary Examiner* — Steven Sax
(74) *Attorney, Agent, or Firm* — Dan Choi; Carole Boelitz; Micky Minhas

(57) ABSTRACT

The present invention relates to a system and method to facilitate efficient and automated presentation of information to users. A decomposition component automatically decomposes an information item into sets of subcomponents in a two- or three-dimensional isometric space, and generates visualizations having interactive graphics that allow users to inspect respective subcomponents. Interface features are provided to enable hover, dwell, and clicking commands, for example, providing a variety of options to zoom in, or change configurations of the visualization in accordance with the users intentions or inferences about what they desire to see or inspect more closely. Beyond the use of decompositions into exploded views of the content of items typically viewed as singular documents, the methods can be applied to perform geometric transformations on visualizations of multiple windows and other resources based on content and activity to provide regularized visualizations of the multiple items. Such exploded views can provide visual geometric summaries of projects, and a set of handles into accessing more detail on the subcomponents of the project.

20 Claims, 24 Drawing Sheets

(56) References Cited

U.S. PATENT DOCUMENTS

| | | | |
|---|---|---|---|
| 5,603,054 | A | 2/1997 | Theimer et al. |
| 5,611,050 | A | 3/1997 | Theimer et al. |
| 5,812,865 | A | 9/1998 | Theimer et al. |
| 5,943,679 | A * | 8/1999 | Niles et al. ............... 715/247 |
| 6,240,421 | B1 | 5/2001 | Stolarz |
| 6,253,218 | B1 | 6/2001 | Aoki et al. |
| 6,404,443 | B1 | 6/2002 | Westerman |
| 6,466,232 | B1 | 10/2002 | Newell et al. |
| 6,513,046 | B1 | 1/2003 | Abbott, III et al. |
| 6,526,577 | B1 * | 2/2003 | Knudson et al. ............ 725/40 |
| 6,546,417 | B1 | 4/2003 | Baker |
| 6,549,220 | B1 * | 4/2003 | Hsu et al. ................. 715/854 |
| 6,549,915 | B2 | 4/2003 | Abbott, III et al. |
| 6,577,330 | B1 * | 6/2003 | Tsuda et al. ............... 715/782 |
| 6,652,287 | B1 | 11/2003 | Strub et al. |
| 6,664,986 | B1 * | 12/2003 | Kopelman et al. ......... 715/849 |
| 6,724,407 | B1 * | 4/2004 | Cheng ....................... 715/848 |
| 6,747,675 | B1 | 6/2004 | Abbott et al. |
| 6,791,580 | B1 | 9/2004 | Abbott et al. |
| 6,801,223 | B1 | 10/2004 | Abbott et al. |
| 6,812,937 | B1 | 11/2004 | Abbott et al. |
| 6,842,877 | B2 | 1/2005 | Robarts et al. |
| 6,918,096 | B2 * | 7/2005 | Hugh ......................... 715/854 |
| 6,920,608 | B1 | 7/2005 | Davis |
| 6,954,750 | B2 * | 10/2005 | Bradford ......................... 1/1 |
| 6,975,988 | B1 | 12/2005 | Roth et al. |
| 7,047,242 | B1 * | 5/2006 | Ponte ............................... 1/1 |
| 7,243,300 | B1 | 7/2007 | Metcalfe et al. |
| 7,290,221 | B2 * | 10/2007 | Anderson et al. ......... 715/848 |
| 7,296,242 | B2 | 11/2007 | Agata et al. |
| 7,350,138 | B1 * | 3/2008 | Swaminathan et al. ...... 715/234 |
| 2001/0040590 | A1 | 11/2001 | Abbott et al. |
| 2001/0040591 | A1 | 11/2001 | Abbott et al. |
| 2001/0042098 | A1 | 11/2001 | Gupta et al. |
| 2001/0043231 | A1 | 11/2001 | Abbott et al. |
| 2001/0043232 | A1 | 11/2001 | Abbott et al. |
| 2002/0032689 | A1 | 3/2002 | Abbott, III et al. |
| 2002/0044152 | A1 | 4/2002 | Abbott, III et al. |
| 2002/0052930 | A1 | 5/2002 | Abbott et al. |
| 2002/0052963 | A1 | 5/2002 | Abbott et al. |
| 2002/0054130 | A1 | 5/2002 | Abbott, III et al. |
| 2002/0054174 | A1 | 5/2002 | Abbott et al. |
| 2002/0078204 | A1 | 6/2002 | Newell et al. |
| 2002/0080155 | A1 | 6/2002 | Abbott et al. |
| 2002/0080156 | A1 | 6/2002 | Abbott et al. |
| 2002/0083025 | A1 | 6/2002 | Robarts et al. |
| 2002/0083158 | A1 | 6/2002 | Abbott et al. |
| 2002/0087525 | A1 | 7/2002 | Abbott et al. |
| 2002/0099775 | A1 | 7/2002 | Gupta et al. |
| 2002/0099817 | A1 | 7/2002 | Abbott et al. |
| 2002/0186254 | A1 | 12/2002 | Monbaron |
| 2003/0001904 | A1 | 1/2003 | Rosen et al. |
| 2003/0041126 | A1 | 2/2003 | Buford et al. |
| 2003/0046401 | A1 | 3/2003 | Abbott et al. |
| 2003/0135558 | A1 | 7/2003 | Bellotti et al. |
| 2003/0135659 | A1 | 7/2003 | Bellotti et al. |
| 2003/0154476 | A1 | 8/2003 | Abbott, III et al. |
| 2003/0219226 | A1 | 11/2003 | Newell et al. |
| 2004/0001112 | A1 * | 1/2004 | Kurtenbach et al. ......... 345/848 |
| 2004/0054737 | A1 | 3/2004 | Daniell |
| 2004/0068515 | A1 | 4/2004 | Hallman |
| 2004/0113948 | A1 * | 6/2004 | Shahrbabaki et al. ........ 345/777 |
| 2004/0179717 | A1 | 9/2004 | Furukawa et al. |
| 2004/0205638 | A1 | 10/2004 | Thomas et al. |
| 2004/0229194 | A1 * | 11/2004 | Yang ............................ 434/118 |
| 2004/0230599 | A1 | 11/2004 | Moore et al. |
| 2004/0267700 | A1 | 12/2004 | Dumais et al. |
| 2005/0005246 | A1 | 1/2005 | Card et al. |
| 2005/0034078 | A1 | 2/2005 | Abbott et al. |
| 2005/0038533 | A1 | 2/2005 | Farrell et al. |
| 2005/0246643 | A1 | 11/2005 | Gusmorino et al. |
| 2006/0036568 | A1 | 2/2006 | Moore et al. |
| 2006/0168561 | A1 | 7/2006 | Wood |
| 2006/0190808 | A1 | 8/2006 | Balthaser |
| 2006/0218588 | A1 | 9/2006 | Kelts |
| 2006/0242564 | A1 | 10/2006 | Egger et al. |
| 2006/0248455 | A1 | 11/2006 | Weise et al. |
| 2008/0270946 | A1 * | 10/2008 | Risch et al. .................. 715/848 |
| 2009/0030948 | A9 | 1/2009 | Lipman et al. |

OTHER PUBLICATIONS

Office Action for U.S. Appl. No. 12/258,802, mailed on Apr. 5, 2011, Eric J. Horvitz, "Exploded Views for Providing Rich Regularized Geometric Transformations and Interaction Models on Content for Viewing, Previewing, and Interacting With Documents, Projects, and Tasks", 13 pages.

Office action for U.S. Appl. No. 12/258,802, mailed on Sep. 5, 2013, Horvitz, et al., "Exploded Views for Providing Rich Regularized Geometric Transformations And Interaction Models On Content For Viewing, Previewing, And Interacting With Documents, Projects, And Tasks", 13 pages.

Billinghurst et al., "An Evaluation of Wearable Information Spaces", Proceedings of the Virtual Reality Annual International Symposium, 1998, 8 pages.

Billinghurst, "Research Directions in Wearable Computing", University of Washington, May 1998, 48 pages.

Billinghurst et al., "Wearable Devices: New Ways to Manage Information", IEEE Computer Society, Jan. 1999, pp. 57-64.

Chen, et al., "A Survey of Context-Aware Mobile Computing Research", Dartmouth Computer Science Technical Report, 2000, 16 pages.

Harter, et al., "A Distributed Location System for the Active Office", IEEE Network, 1994, pp. 62-70.

Horvitz et al., "Attention-Sensitive Alerting in Computing Systems", Microsoft Research, Aug. 1999.

Horvitz et al., "In Pursuit of Effective Handsfree Decision Support: Coupling Bayesian Inference", Speech Understanding and User Models, 1995, 8 pages.

Joachims, "Text categorization with support vector machines: learning with many relevant features", Machine Learning, European Conference on Machine Learning, Apr. 21, 1998, pp. 137-142.

Losee, "Minimizing information overload: the ranking of electronic messages", Journal of Information Science 15, Elsevier Science Publishers B.V., 1989, pp. 179-189.

International Search Report dated Sep. 29, 2003, for PCT Application Serial No. 00/20685, 3 pages.

Rhodes, "Remembrance Agent: A continuously running automated information retrieval system", the Proceedings of he First International Conference on The Practical Application of Intelligent Agents and Multi Agent Technology, 1996, pp. 487-495.

Rhodes, "The Wearable Remembrance Agent: A System for Augmented Theory", The Proceedings of the First International Symposium on Wearable Computers, Oct. 1997, pp. 123-128.

Rhodes, "The Wearable Remembrance Agent: A System for Augmented Memory", Personal Technologies Journal Special Issue on Wearable Computing, 1997, 12 pages.

Schilit et al., "Context-Aware Computing Applications", In Proceedings of the Workshop on Mobile Computing Systems and Applications, Dec. 1994. pp. 85-90.

Schilit et al. "Customizing Mobile Applications", Proceedings USENIX Symposium on Mobile and Location INdependent Computing, Aug. 1993, 9 pages.

Schilit et al., "Disseminating Active Map Information to Mobile Hosts", IEEE Network, 1994, pp. 22-32, vol. 8—No. 5.

Schilit et al., "The ParcTab Mobile Computing System", IEEE WWOS-IV, 1993, 4 pages.

Schilt, "A System Architecture for Context-Aware Mobile Computing", Columbia University, 1995, 153 pages.

Spreitzer et al., "Architectural Considerations for Scalable, Secure, Mobile Computing with Location Information", In The 14th International Conference on Distributed Computing Systems, Jun. 1994, pp. 29-38.

Spreitzer, et al., "Providing Location Information in a Ubiquitous Computing Environment", SIGOPS '93, 1993, pp. 270-283.

(56) References Cited

OTHER PUBLICATIONS

Spreitzer et al., "Scalable, Secure, Mobile Computing with Location Information", Communications of the ACM, Jul. 1993, 1 page, vol. 36—No. 7.

Starner, Wearable Computing and Contextual Awareness, Massachusetts Institute of Technology, Jun. 1999, 248 pages.

Theimer, et al., "Operating System Issues for PDAs", In Fourth Workshop on Workstation Operating Systems, 1993, 7 pages.

Want, "Active Badges and Personal Interactive Computing Objects", IEEE Transactions on Consumer Electronics, 1992, 11 pages, vol. 38—No. 1.

Want et al., "The Active Badge Location System", ACM Transactions on Information Systems, Jan. 1992, pp. 91-102, vol. 10—No. 1.

Weiser, "Some Computer Science Issues in Ubiquitous Computing", Communications of the ACM, Jul. 1993, pp. 75-84, vol. 36—No. 7.

Weiser, "The Computer for teh 21st Century", Scientific American, Sep. 1991, 8 pages.

"Workshop on Wearable Computing Systems", Aug. 19-21, 1996.

\* cited by examiner

FIG. 13

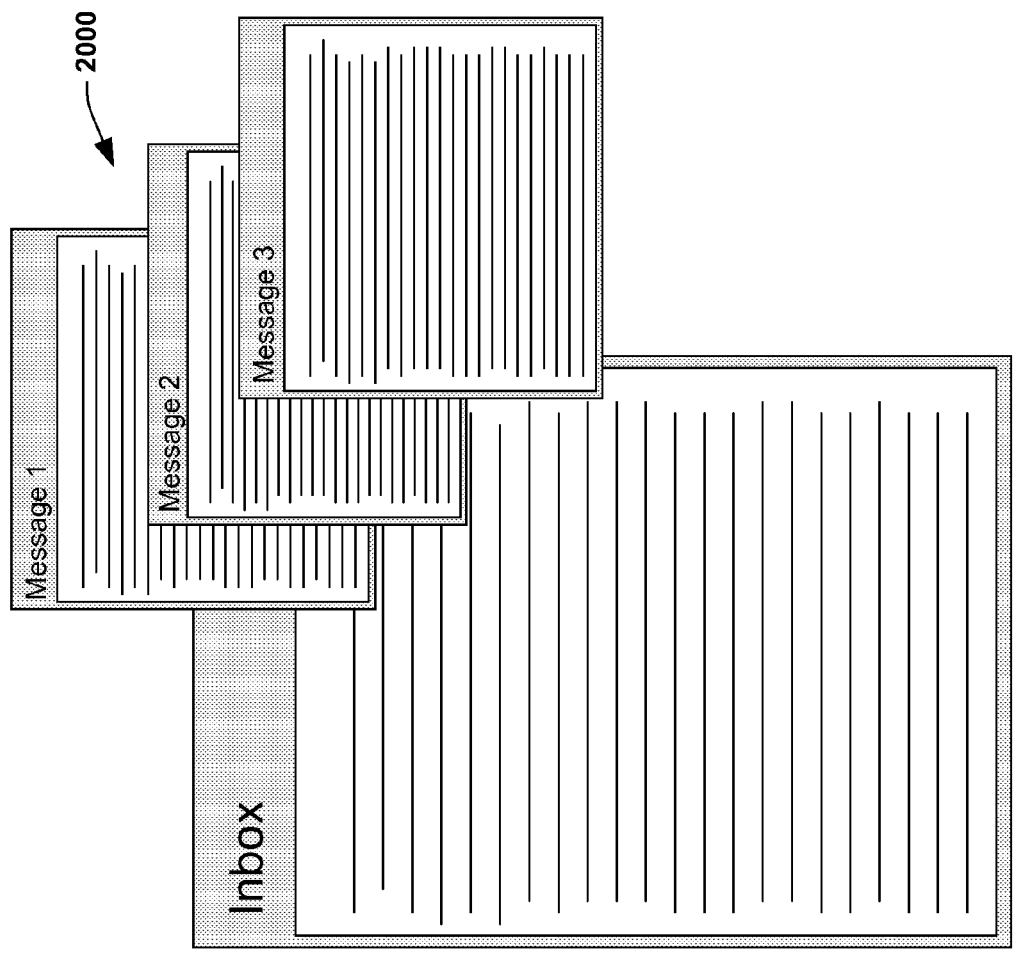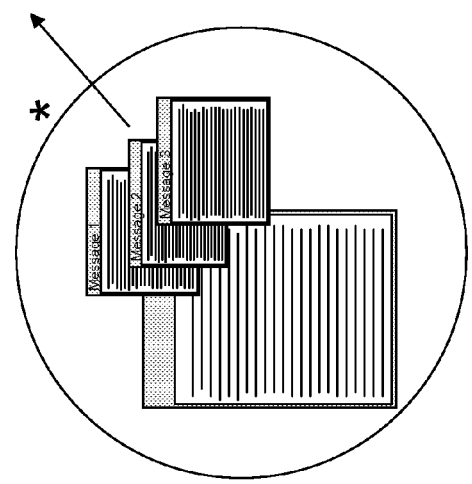
FIG. 20

EXPLODED VIEWS FOR PROVIDING RICH REGULARIZED GEOMETRIC TRANSFORMATIONS AND INTERACTION MODELS ON CONTENT FOR VIEWING, PREVIEWING, AND INTERACTING WITH DOCUMENTS, PROJECTS, AND TASKS

REFERENCE TO RELATED APPLICATIONS

This application is a Divisional of U.S. patent application Ser. No. 10/609,890, filed Jun. 30, 2003 and entitled EXPLODED VIEWS FOR PROVIDING RICH REGULARIZED GEOMETRIC TRANSFORMATIONS AND INTERACTION MODELS ON CONTENT FOR VIEWING, PREVIEWING, AND INTERACTING WITH DOCUMENTS, PROJECTS, AND TASKS, which is incorporated herein by reference.

TECHNICAL FIELD

The present invention relates generally to computer systems. More particularly, the present invention relates to systems and methods providing rich previews of documents, projects, and/or other digitally stored items via automated decomposition of such items in the form of graphical representations that are rendered by an associated user interface.

BACKGROUND OF THE INVENTION

Various graphical user interfaces have been developed to provide an interactive framework for computer users. Computer programs typically provide a graphical user interface (GUI) to facilitate data entry, to enable viewing output on a display screen, as well as to manipulate or rearrange data. A graphical user interface can be associated with an application program or operating system shell, which may be running on a user's local machine and/or remotely, such as in a distributing computing system or over the Internet.

In view of continuing technological developments and increasing use of the Internet, people are using computers to access information to an ever-increasing extent. Such information can reside locally on the person's computer or within a local network or be global in scope, such as over the Internet.

Users of window-based graphical user interfaces face difficult problems when they employ various programs for multiple tasks or activities—they often have a large number of windows to manage, with many windows for each task. Switching between tasks is difficult because the windows often can be scattered around. Moreover, if windows are minimized while not in use, they are typically not organized together. If not minimized, a user can be faced with a difficult task of locating all relevant obscured windows and bringing them to a top of a display.

When users begin employing large display configurations (e.g., multiple monitors), managing windows and tasks becomes an ever more difficult problem, because minimized windows are kept in a location that may be significantly distant from where they will be used. Managing many display objects on small displays (e.g., PDA's) is also difficult—in such case, oftentimes sufficient screen space is not available to display objects of interest.

As the amount of information content grows, another problem faced by users is that they are often forced to perform combinations of searching and browsing to identify information items of interest. Thus, users need more efficient means to discriminate the target items they are pursuing. Also, as the complexity of each item grows, users may desire to have more efficient access into portions of the items, without having to necessarily open an item in a full-blown application in order to do so. Although various attempts have been made via conventional user interface schemes to address some of the aforementioned concerns, there is still a substantial unmet need for a system and/or methodology that facilitates efficient use of valuable computer user's time and cognitive resources in a multi-task working environment.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to systems and methods that generate rich previews of files, and/or other digitally-stored items, in the form of interactive graphical representations of computational items or files, based on such properties of the item as type of item, item structure, item content, and metadata about the history of interaction with the item, for example. The interactive representations allow users to inspect, probe, and navigate among document subcomponents of items at focus of attention, before "launching" a full application.

One particular aspect of the present invention includes automated decomposition of electronically stored items or sets of items into interrelated subcomponents. This includes employing rich visualizations and interactive graphics to expand the item or subcomponents into various "cognitive chunks" that can then be efficiently processed by users. Respective systems and methods can be employed as a rich preview enabling users to inspect sets of items, such as text applications, presentation or graphics applications, and email documents, for example, within a rich "Exploded Views Previewer," or interface that takes users well beyond simple initial pages or other types of thumbnails. However, it is noted that preview applications in accordance with the present invention also can be generalized to other uses. As an example, rich previewing can be employed within applications as a process for inspecting and navigating among components of an item being extended or refined.

The subject invention also provides for a rich interface that greatly facilitates rapid viewing of information. Data, files, documents and so forth can be represented via 2 or 3-dimensional icons or display objects wherein a z-axis of the icon corresponds to parameter of the item represented by the icon. As a user moves a cursor along the z-axis of the icon (or other axis), a preview pane displays for example pages corresponding with the particular point(s) on the axis. A user can thus quickly review a document and locate a specific point in the item of interest. By selecting the point, the item is opened at that location of interest. The depth of the icon or display can also be indicative of file size or other predetermined metric.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

BRIEF DESCRIPTION OF THE DRAWINGS

FIGS. 11-14 illustrate alternative example interfaces in accordance with an aspect of the present invention.

FIGS. 15-21 illustrate alternative exploded views in accordance with an aspect of the present invention.

DETAILED DESCRIPTION OF THE INVENTION

The present invention relates to a system and method to facilitate efficient and automated presentation of information to users. A decomposition component automatically decomposes an information item into sets of subcomponents in a two- or three-dimensional isometric space, and generates visualizations having interactive graphics that allow users to inspect respective subcomponents. Interface features are provided to enable hover, dwell, and clicking commands, for example, providing a variety of options to zoom in, or change configurations of the visualization in accordance with the user's intentions or inferences about what they desire to see or inspect more closely. In one example, the visualization and interactive behavior draw on an analogy to "exploded views" that are typically observed in engineering and technical manuals (e.g., an exploded view of a brake lining in an automotive repair manual).

As used in this application, the terms "component," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 1:
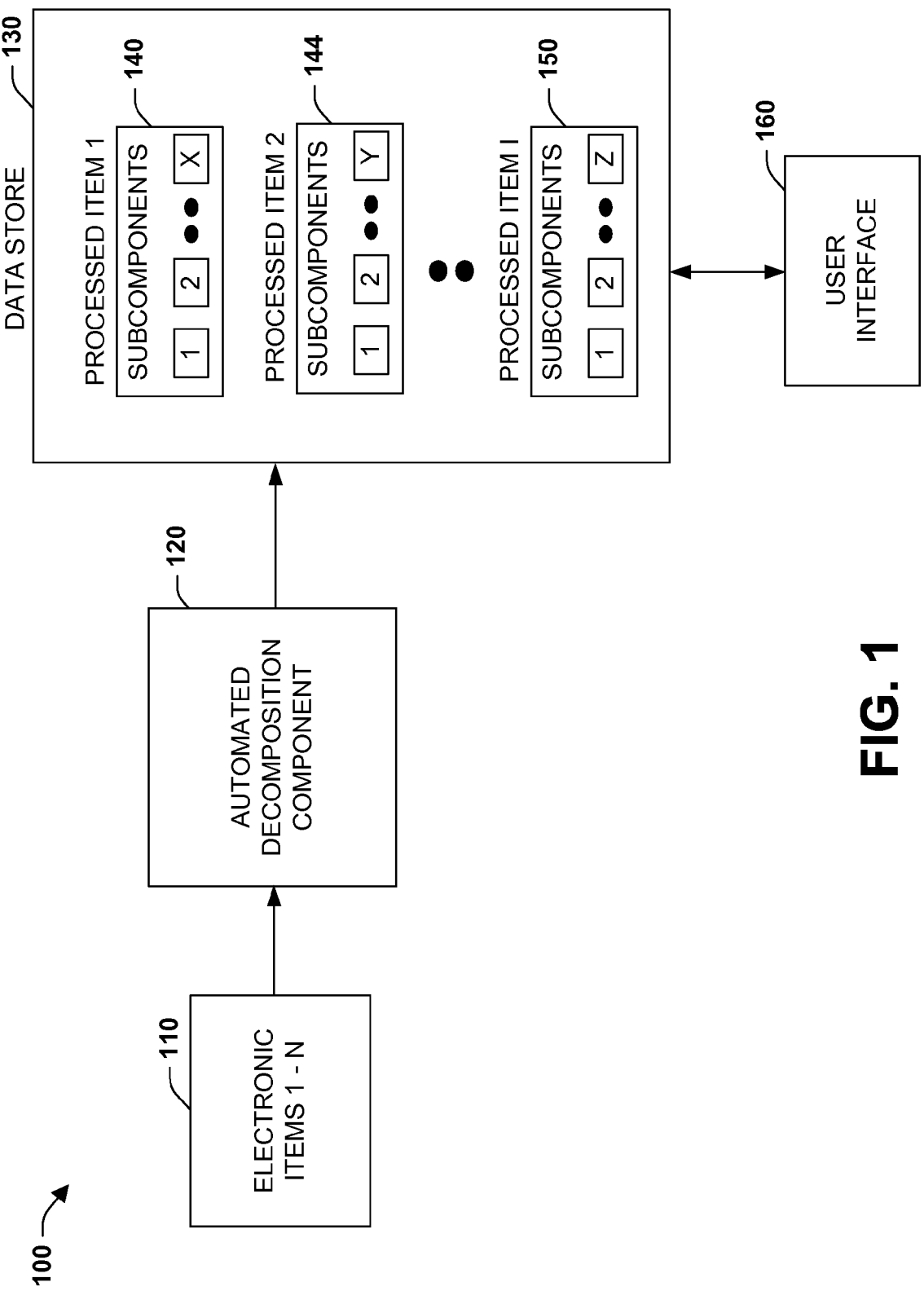
FIG. 1 is a schematic block diagram illustrating item decomposition and rendering in accordance with an aspect of the present invention.

Referring initially to FIG. 1, a system 100 illustrates item decomposition and rendering in accordance with an aspect of the present invention. One or more electronic items 110 are processed by an automated decomposition component 120 which formats the items 110 into a data storage 130. The formatting includes creation of one or more processed items 140 through 150 which can then be presented and rendered to a user via a user interface 160. The automated decomposition component 120 includes various decision processes or algorithms for formatting the processed items 140-150 and are described in more detail below with respect to FIG. 3. The processed items 140-150 include one or more subcomponents that compose a grouping or subset of high-level information displays that can be dynamically rendered to the user via the user interface 160. Such renderings can include various dimensions, shapes, user controls, sizing, groupings, content renderings, and other utilities for interacting with the subcomponents of the processed items 140-150 and controlling the display of information to the user.

At preview time at the user interface 160 (or any time the systems and methods of the system 100 are invoked), an item at focus is rendered in a rich geometrical layout, employing renderings and animations employing two- or three-dimensional graphics. The visualizations are generally a function of one or more of properties associated with the type of item, item structure, item content, and metadata about the history of interaction with the item. Users can browse components of the items, at times, selectively zooming with a mouse and keyboard (or other input device) on subcomponents, in a graphical and/or semantic manner, and also executing more traditional applications in new ways. As an example, a user can see visually, the last page that was edited and can bring that page up to the immediate foreground in a Word processor via use of the user interface 160 having preview options for the processed items 140-150 as is described in more detail below.

Beyond the basic design of user previews of the processed items 140-150, and associated set of interaction behaviors, a development environment or SDK allowing third-parties to design and test different preview variants for use in a more general operating system platform can be provided. Such environment could be provided as a software package that enables users to input or analyze desired electronic items 110 while viewing and or manipulating various renderings of the processed items for later display to the user. Also, users can be provided with a set of preference controls that could change, by type of item 110, the rich preview visualizations and access behaviors associated therewith. The system 100 can also be coupled with offline, or real-time analysis (using principles of continual computation), and caching of the rendered results so as to minimize latencies in real time.

It is to be appreciated that the present invention can employ substantially any coordinate system, including multidimensional coordinate systems, and employ substantially any display format for the user interface 160, wherein the display format can include substantially any shape, color, sound, dimension (e.g., displaying list of items in 3 dimensions), code format-including embedded executables, and include combinations of these and other respective formats or attributes. In addition, information retrieved from the data store 130 can be directed to substantially any portion of a display (not shown) associated with the user interface 160. It is noted that display content can be transformed as it is rendered at the user interface 160. For example, the content or processed items-140-150 could be scaled in a smaller manner such as generating an iconic representation of the content.

The user interface 160 can be provided as part of the graphical user interface in association with the data store 130 and can be provided as part of and/or in association with a display. The display can be configured via interfaces regarding various aspects of display or content preferences, configurations and/or desired information formatting by the user. The display can include display objects (e.g., icons, buttons, sliders, input boxes, selection options, menus, tabs, and so forth) having multiple dimensions, shapes, colors, text, data and sounds to facilitate optimal control, sizing/resizing, format and/or display of the processed items 140-150. In addition, various menus and alternative screens or display outputs can be provided that perform a plurality of aspects of the present invention. These aspects can also include a plurality of inputs for adjusting and configuring one or more aspects of the present invention. This can include receiving user commands from a mouse, keyboard, speech input and/or other device to effect operations of the display via an associated graphical user interface.

Figure 2:
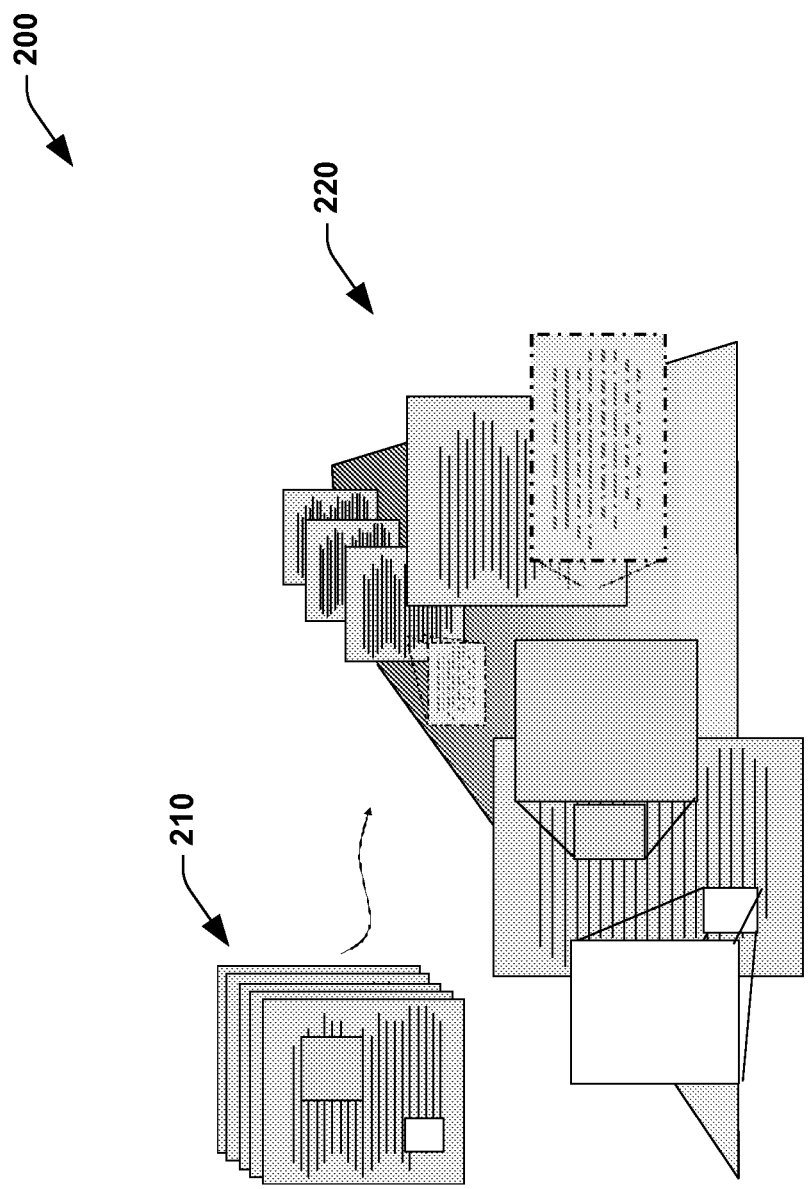
FIG. 2 is a diagram illustrating an exemplary exploded view interface in accordance with an aspect of the present invention.

Referring briefly to FIG. 2, a system 200 is illustrates an exemplary exploded view interface in accordance with an aspect of the present invention. In this aspect, a collection of item subcomponents 210 (e.g., pages of a text document) are rendered in various formats at a display 220. This can include rendering portions of a document and/or selecting various subcomponents and portions relating to a selected subcomponent. These aspects are described in more detail in the discussion relating to FIGS. 5-10.

The system 200 depicts a high-level example of the generation of an exploded view of a document. In today's systems, the initial document might appear as a text identifier or thumbnail. An exploded view previewer 220 may structure the document in an isometric three-space representation, decomposed into a set of pages comprising the document, sequenced from front to back. Key pages, e.g., the initial page of the document might be further "exploded," highlighting key content, such as figures, graphics and links. Special pages, like the last page that was edited or pages where most of the recent work has occurred may be highlighted via overall enlargement, being pulled out of a stack in one or more ways. Such pages might also be decomposed via highlighting into components that were pre-existing and components that were last generated (red greeking). Users can mouse over different regions to expand, move, and inspect additional details. Clicking on components or sub-details can invoke the appropriate application software to execute and bring the document up at a particular place noted by the user, via the exploded view display 220.

Figure 3:
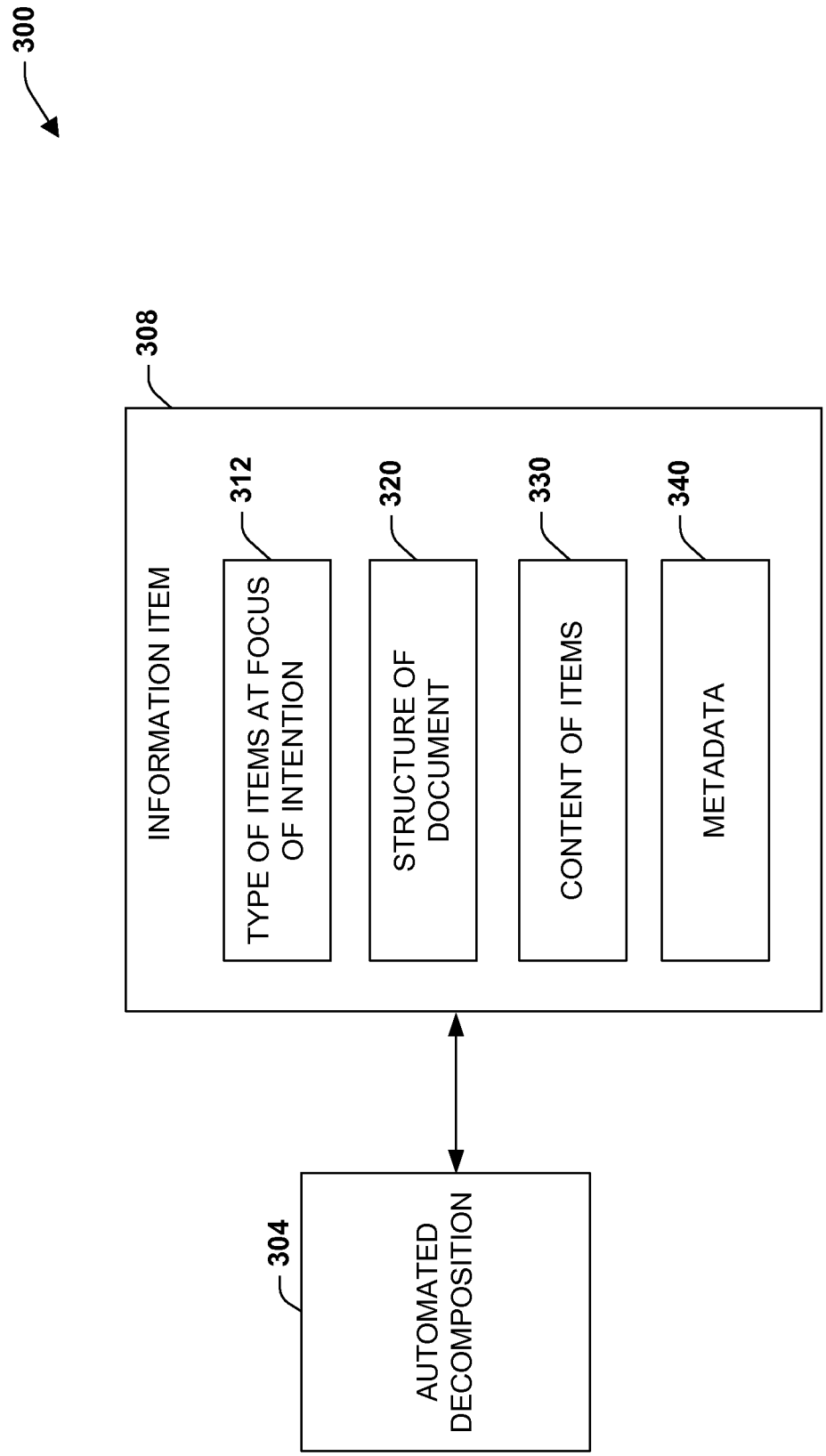
FIG. 3 is a block diagram illustrating subcomponent processing in accordance with an aspect of the present invention.

Turning to FIG. 3, a system 300 is illustrates subcomponent processing in accordance with an aspect of the present invention. As noted above, an automated decomposition 304 may occur for one or more information items 308. For digital items, the structure of the "exploded view" can hinge on an analysis of the nature of the type of items at focus of attention at 312 (e.g., is this a Powerpoint file, a Word document, a set of interrelated emails, a set of pictures, etc.). The structure of the document at 320 (e.g., number and sequence of pages, figures appear on a subset of pages, interrelated emails, sequence of images taken over time, etc.), details about the content of the items at 330, and metadata capturing such information as the when and/or how often different components were created, modified, or accessed at 340.

As an example, a rich exploded view preview might be configured to display when a preview is requested of a document, all pages of the document, in a sequence of pages in an isometric layout in a pseudo-three dimensional space, using depth cues, and including the graphical content of each page. The last page examined or modified by the user can be specially rendered in a manner than points this subcomponent out to the user to facilitate efficient processing of information.

It is noted that the systems and methods of the present invention can be extended with rich metadata schema associated with documents or projects that captures such information as the time, nature, and duration of accesses. For example, for documents, "attentional annotations" can be stored as metadata capturing for different parts of the document, how long a user was noted to have viewed or to have actively worked on the components. The exploded view can use such information in decisions about the geometric layout and highlighting of the information, including the explicit use of metaphors like color and size to show regions that have been most attended to most recently, or that have been attended to varying degrees over the lifetime of the document or project.

Figure 4:
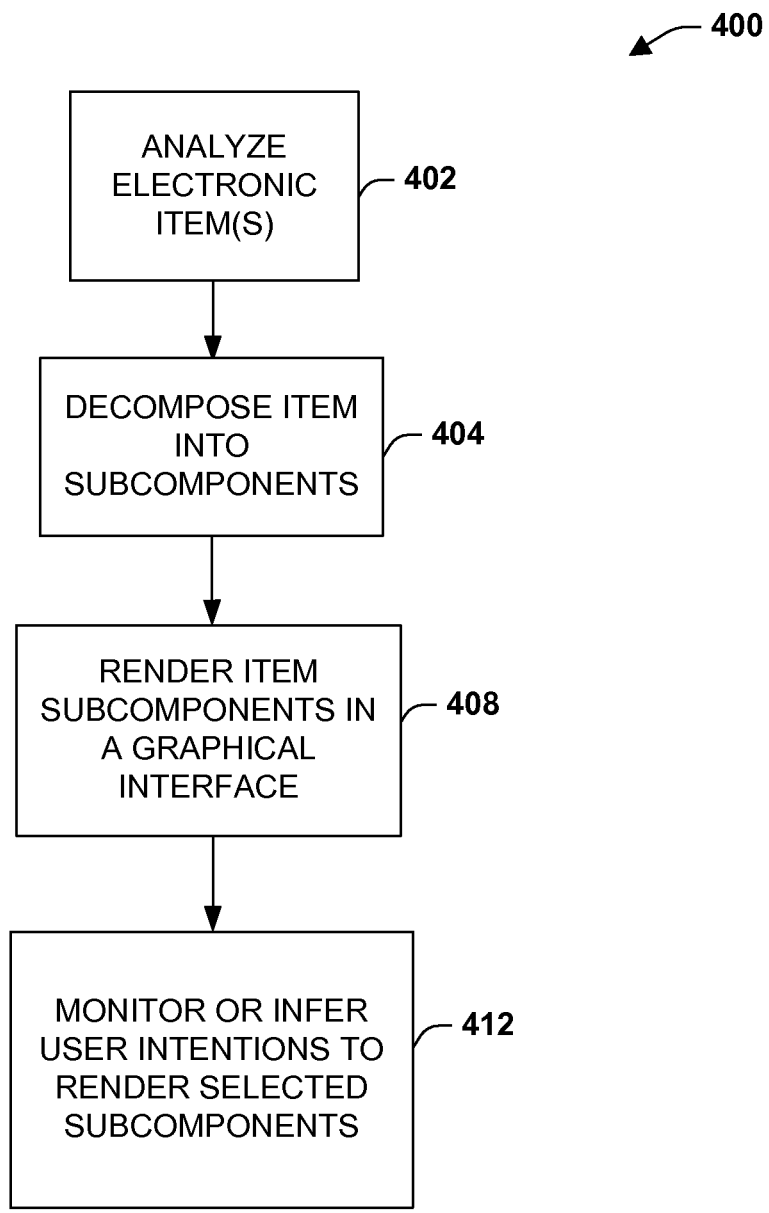
FIG. 4 is a flow diagram illustrating exploded view processing in accordance with an aspect of the present invention.

FIG. 4 illustrates a methodology for exploded view processing in accordance with the present invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Proceeding to 402, one or more information items are automatically analyzed. As noted above, this can include analyzing the types of items that are at focus of attention, document structures, item content, and/or metadata associated with an item. At 404, an information item such as a graphics file, presentation document, spreadsheet, word document, and so forth are automatically decomposed into one or more subcomponents. At 408, item subcomponents are rendered in a graphical interface. Such interface can include multidimensional renderings to illustrate the respective subcomponents of the information item. At 412, user intentions and/or actions are automatically monitored in order to suitably render selected subcomponents. For example, actions such as mouse clicks or curser hovering over an item can bring up more details relating to the selected item or spawn other actions such as launching an associated application.

Figure 5:
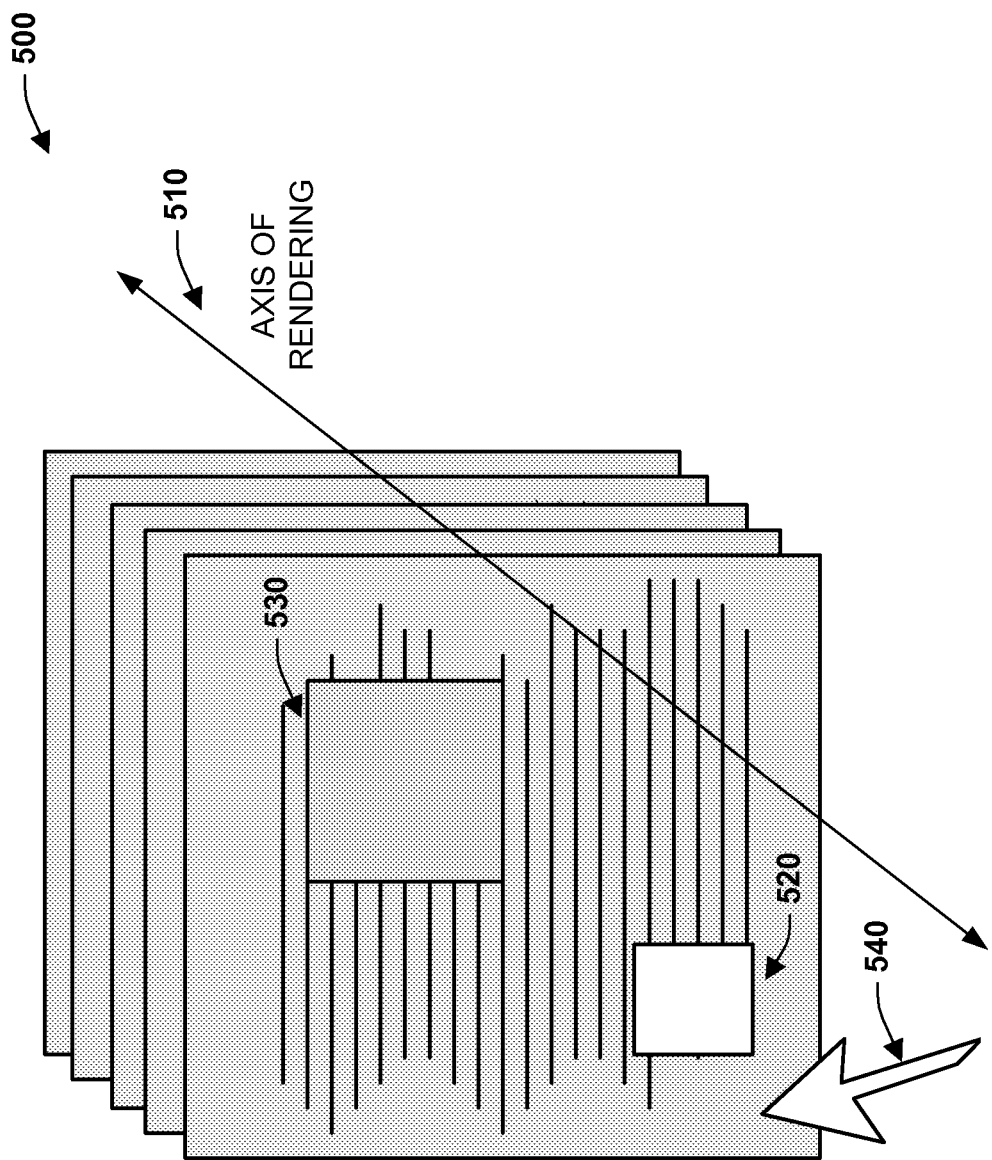
FIGS. 5-10 are example user interfaces illustrating exploded views and user controls in accordance with an aspect of the present invention.
Figure 6:
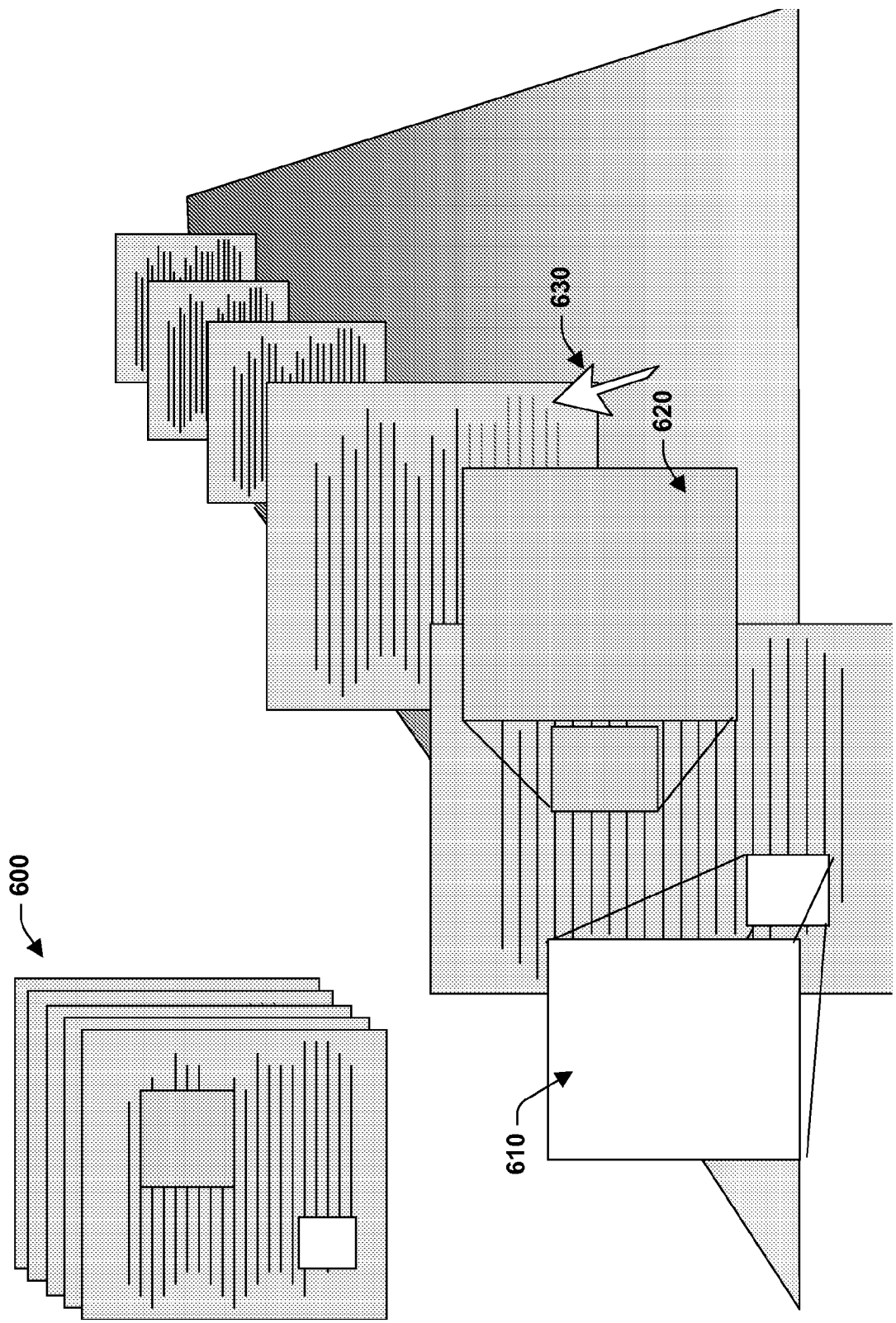

FIGS. 5-10 are example user interfaces illustrating exploded views and user controls in accordance with an aspect of the present invention. FIG. 5 depicts an information item 500 having one or more subcomponents which are graphically displayed along an axis of rendering 510. Respective subcomponents may have various portions such as illustrated at 520 and 530 for providing more detailed information such as graphics, text, embedded audio and/or image files, and so forth. It is to be appreciated that although rectangular components are illustrated, information can be rendered in substantially any size shape, color, dimension, and so forth. If a mouse selection is made at 540, an exploded view of the item 500 may appear as depicted in FIG. 6.

FIG. 6 depicts various subcomponents of an item 600 which can be selected and exploded to provide more detailed information, if desired. For example, portions 610 and 620 are expanded from a page to illustrate information such as graphics or text. If a mouse selection is made at 630, another subcomponent is selected as depicted in FIG. 7.

Figure 7:
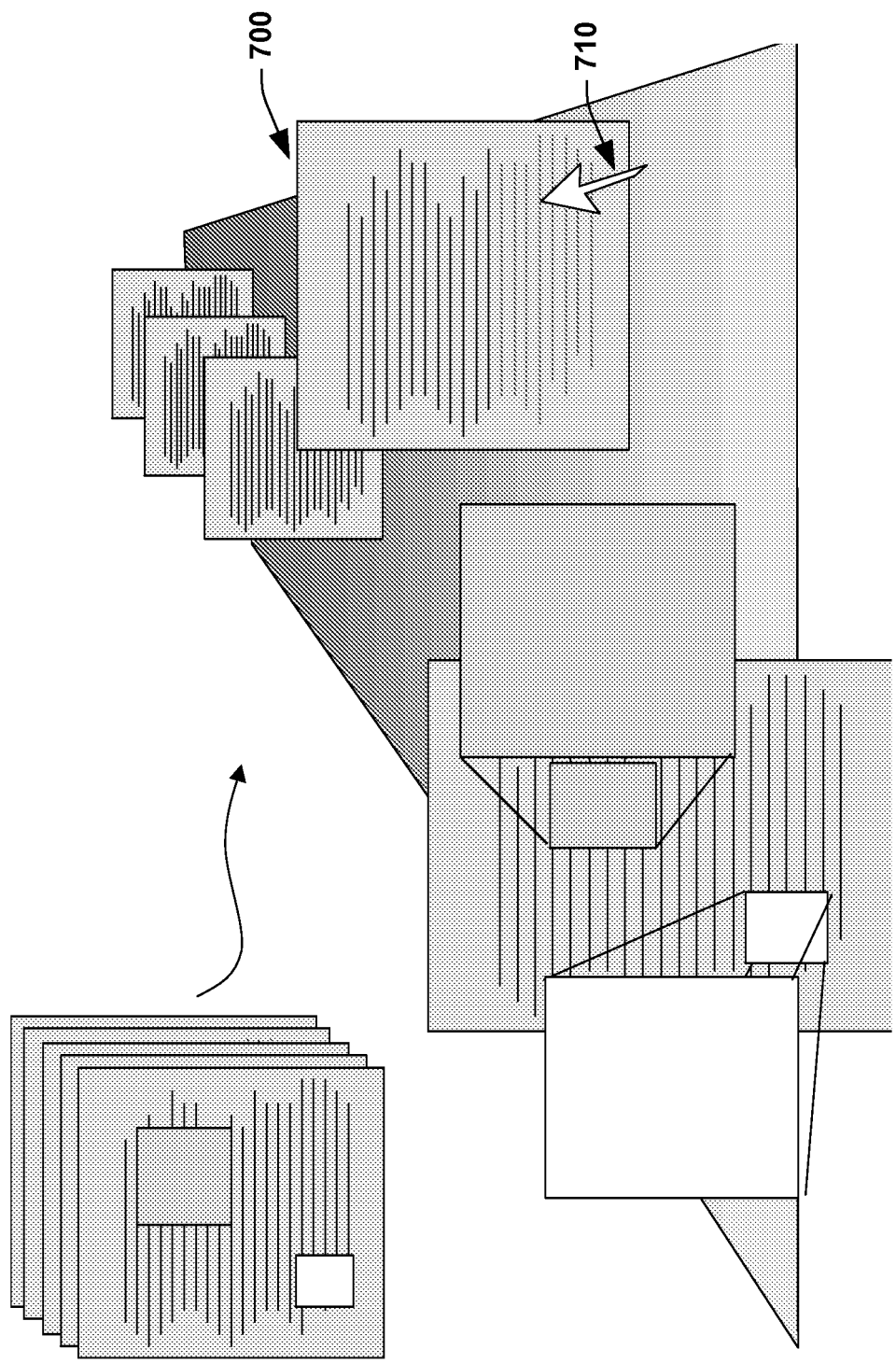

FIG. 7 depicts a subcomponent 700 that has been selected by a user in FIG. 6. Upon selection, the subcomponent 700 can be raised or automatically moved along any axis (according to user preference settings) to display information associated with the selection. At 710, the user may hover over a portion of the subcomponent 700 to further drill for information that is depicted in FIG. 8.

Figure 8:
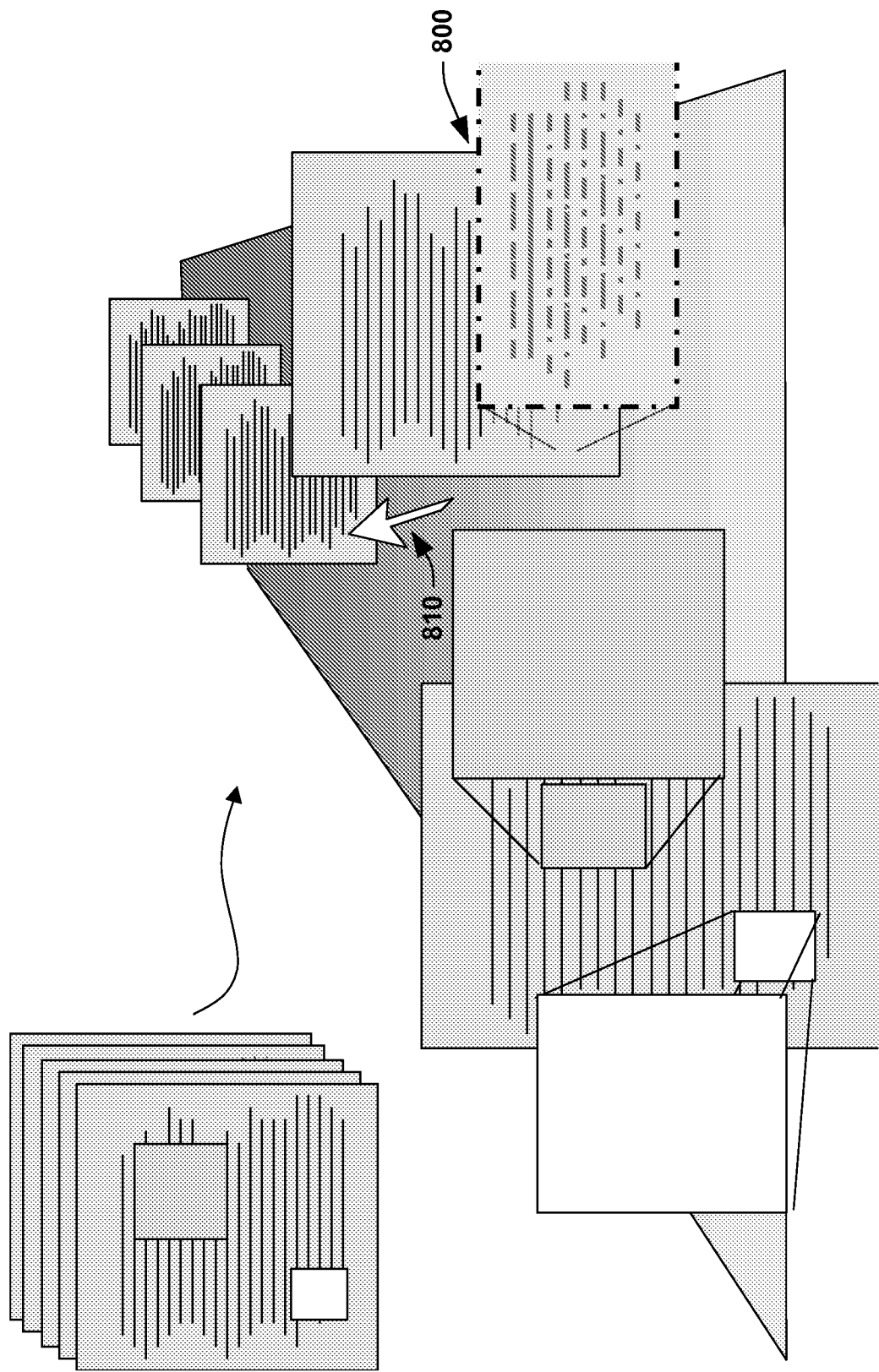
Figure 9:
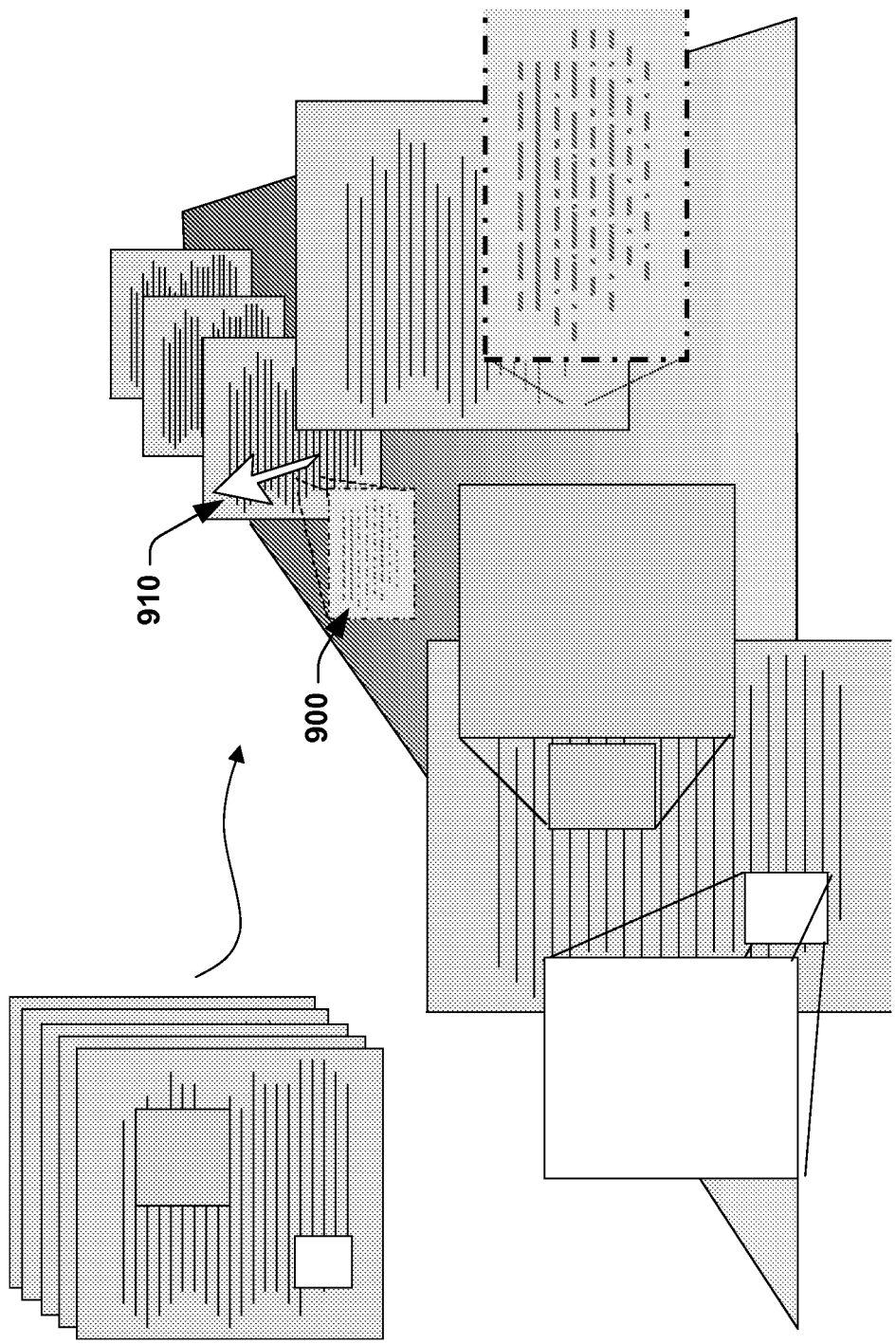
Figure 10:
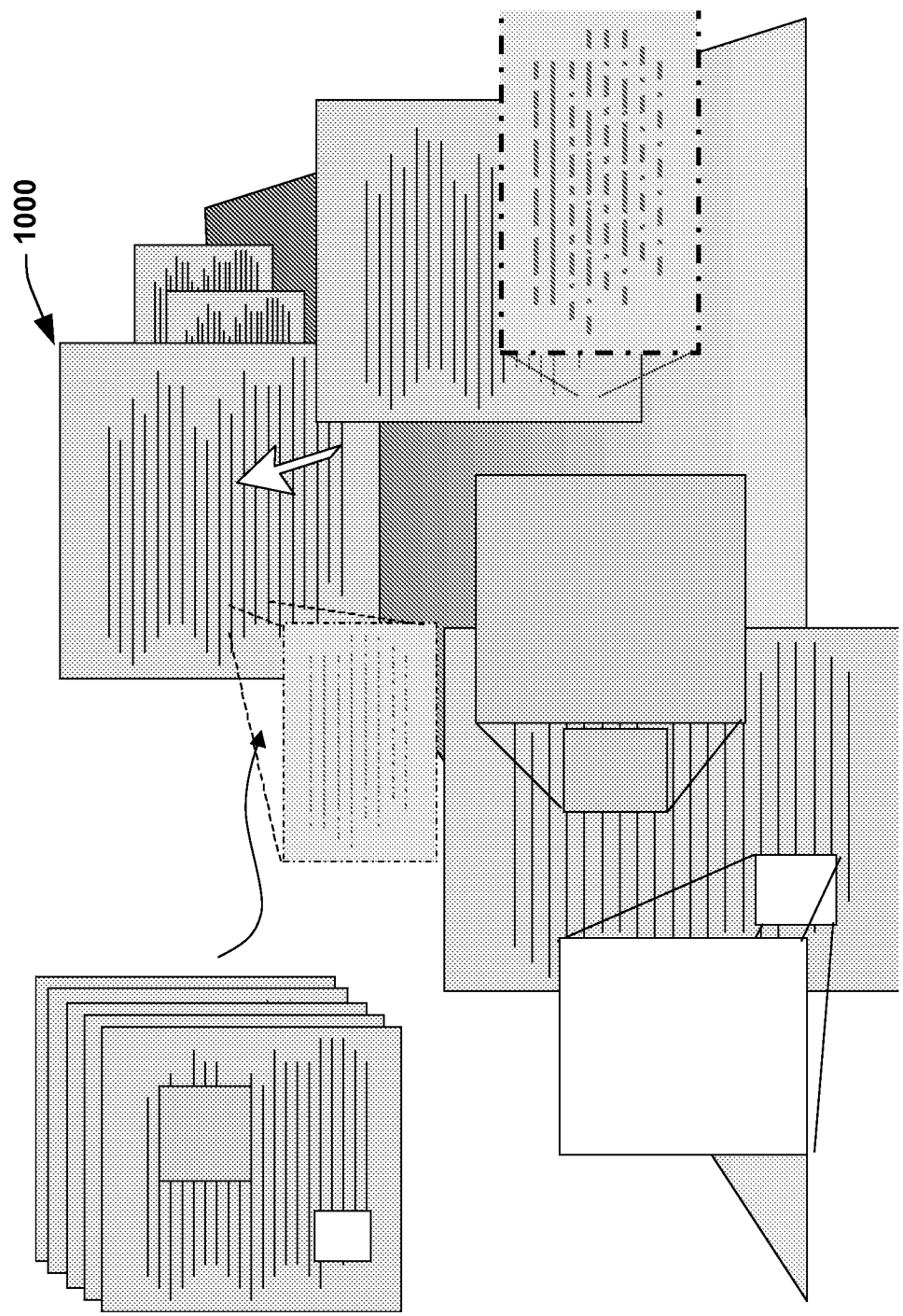

FIG. 8 illustrates a selected portion 800 that is exploded to provide further information. At 810, another subcomponent is selected by a user and is depicted in FIG. 9. In this Figure, the selection at 810 of FIG. 8 causes a portion of another subcomponent to be displayed at 900 in FIG. 9. If desired, this portion can be further expanded via a selection at 910. This expansion is depicted at 1000 of FIG. 10.

Figure 11:
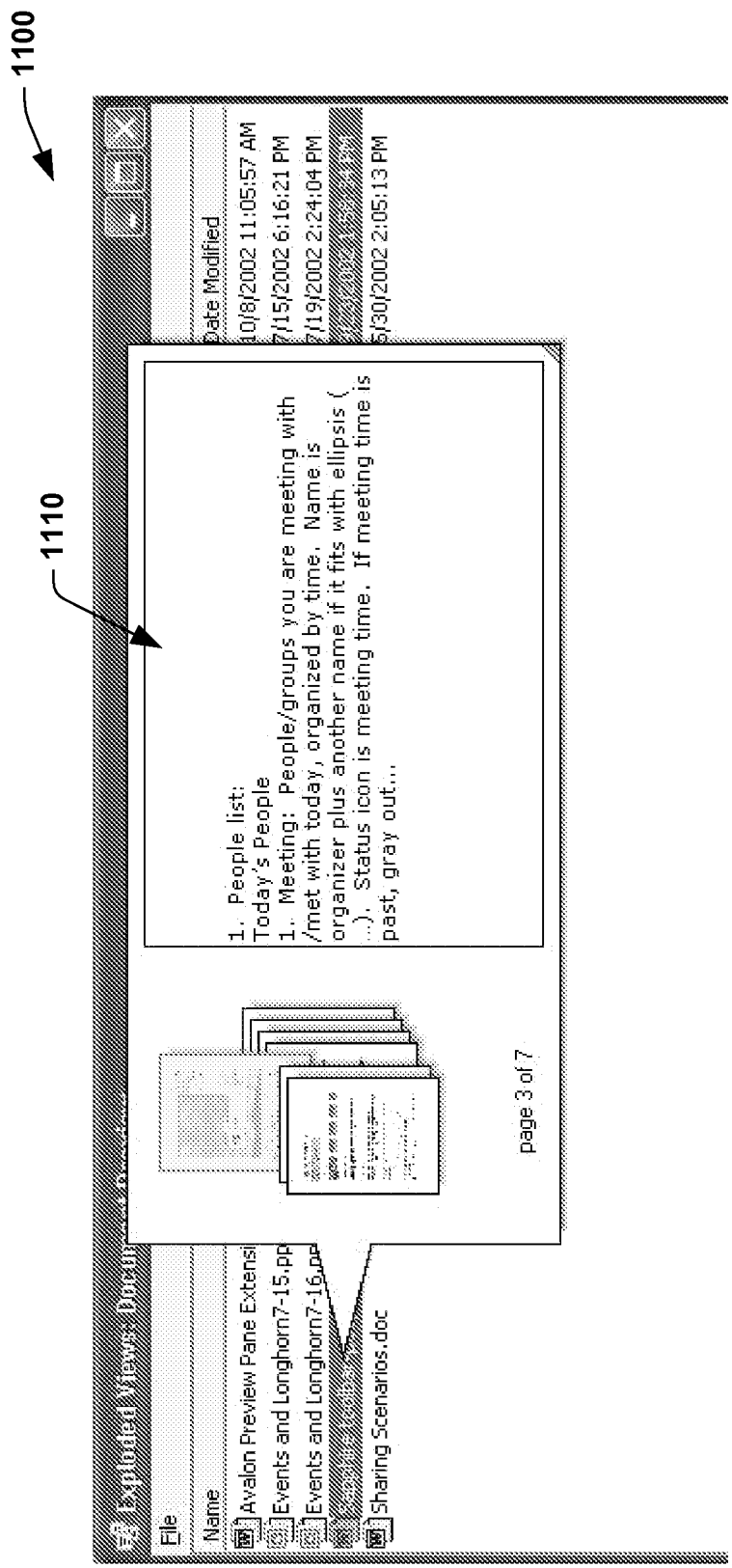
Figure 12:
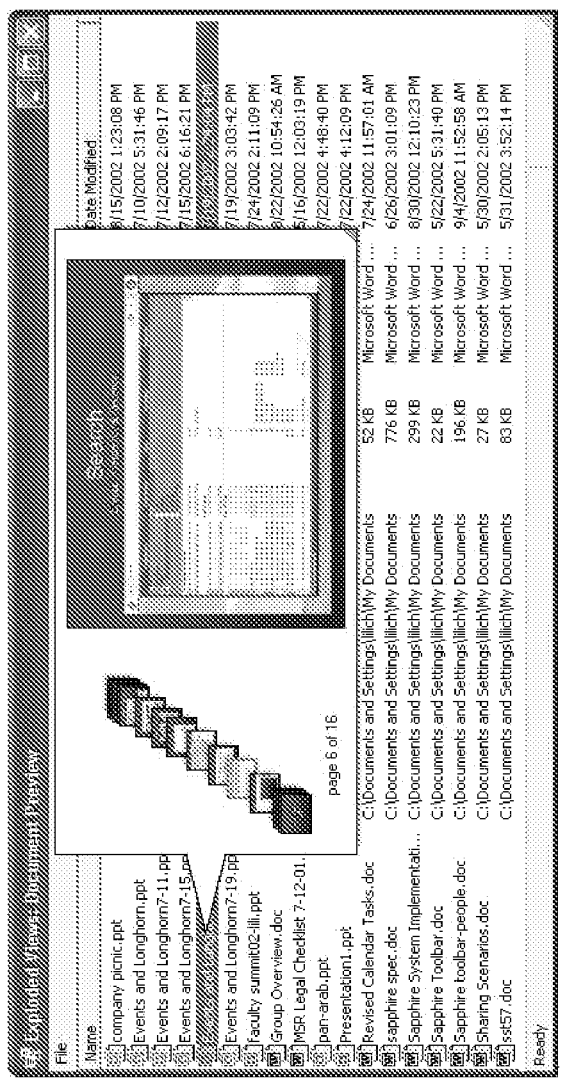

FIGS. 11-14 illustrate alternative example interfaces in accordance with an aspect of the present invention. FIG. 11 depicts an example interface 1100 representing an exploded view preview of Word documents. The document pages are rendered as a set of thumbnails in an isometric space. Users can thumb through the pages of the preview by cursoring over the pages. Each page lifts out of the stack in turn, and pauses, given a cursor dwell, revealing, in a separate window 1110 more details about the content of the page. Users can execute a Word application from the preview (e.g., MS Word, Word Perfect), bringing the application directly to the page for editing. FIG. 12 illustrates similar concepts except that exploded views are applied to presentation documents such as PowerPoint, for example.

Figure 13:
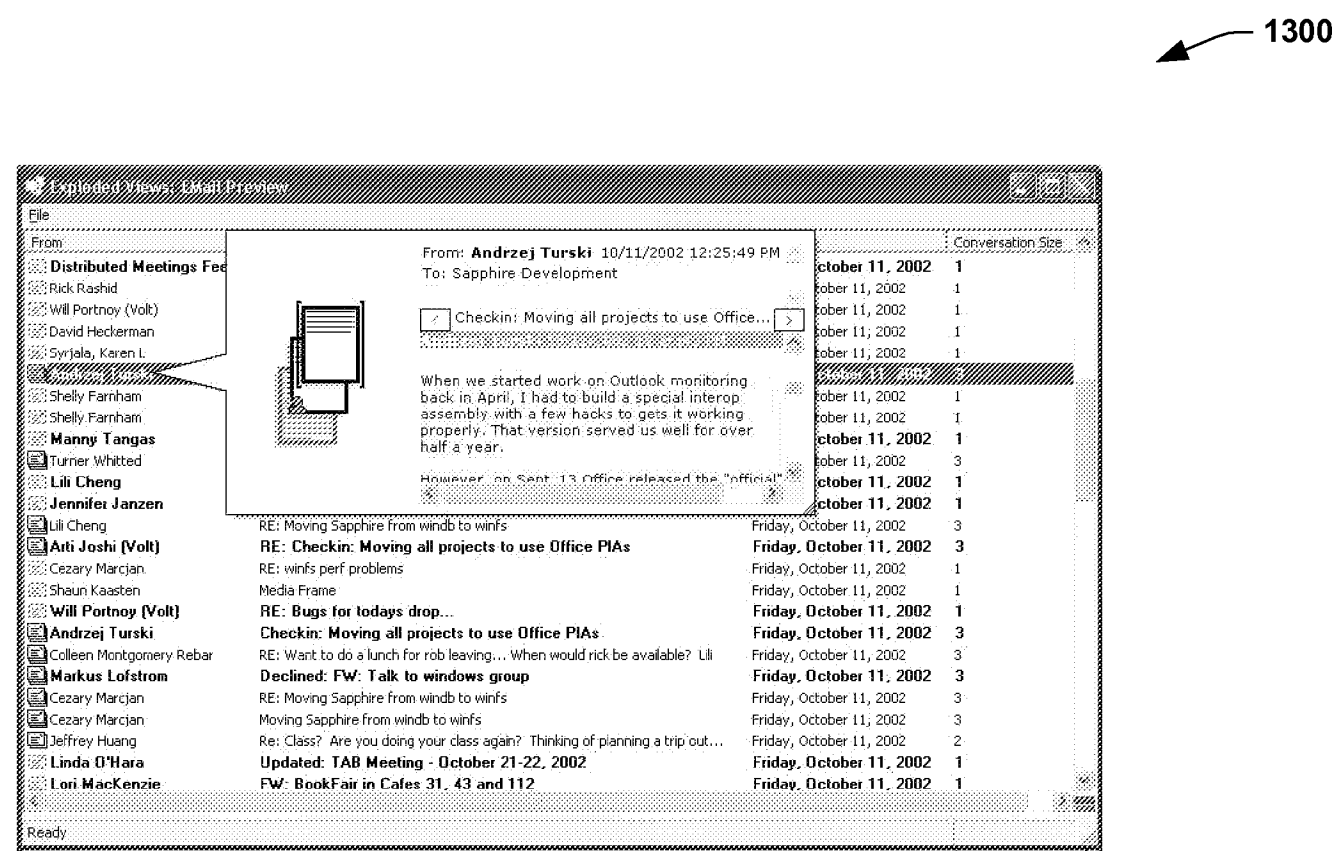

FIG. 13 is an example interface 1300 illustrating exploded view previews for email messages. Expanding out an email message reveals the structure of a conversation via a thread or other component. Useful annotations can be added to the messages. Such annotations include indications of people being added or dropped as the conversation has progressed. Other aspects including changing color or sounds based upon characteristics of a selected or displayed item. For example, (plus) +Icon in green for a new person in a user's email system and a (minus) –icon in red for a dropped person. Users can navigate directly to the portion of the conversation of interest, appearing in an expanded text box at the right or other location, via pointing at particular pages with a cursor.

Figure 14:
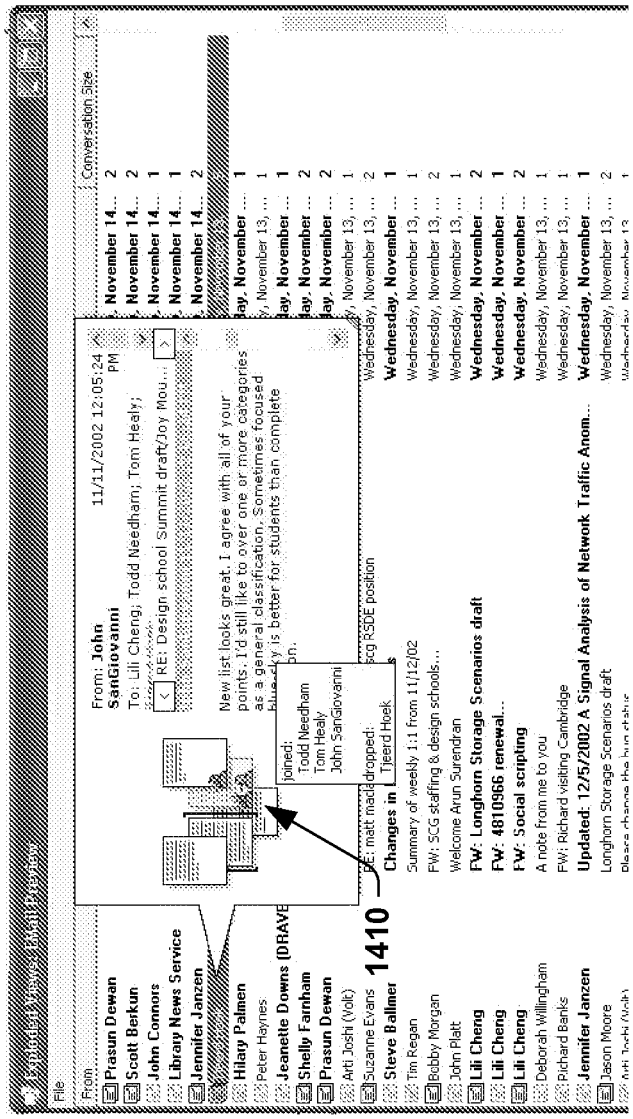

FIG. 14 illustrates an example interface 1400 depicting exploded view previews for email messages demonstrating a more complicated, branching conversation. In this case two sub-threads or sub-conversations have been spawned from an initial message. As indicated by the people icons in the highlighted message at 1410, people have been added and dropped in one of the initial sub-conversations. By hovering on the icons, a summary of the people added and dropped can be inspected. New people and dropped people can also be highlighted in the expanded text view at the right.

The systems and methods of the present invention apply not only to previewing documents, before access, but also to visually summarizing documents or projects in other usage scenarios. A class of scenarios that can harness the richness of the visual representations of exploded views are task management and recovery scenarios and associated methods. Today, multiple resources and windows associated with different projects are simply overlayed or manually opened and closed. Rich task managers can be constructed that allow sets of resources, and associated displays of content (e.g., windows displaying content and their positions) to be defined as tasks and manipulated together, allowing for example the closing and opening of tasks or "projects" involving the re-generation of windows with their content at the locations they were in before a project was closed.

A task management and recovery system can enable users to define tasks or projects with content from one or more applications, either explicitly, based on a task definition procedure such as an interface that allows a user to manually enter a set of resources, or implicitly by linking tasks to particular applications (such as working with an email application), or by observing which resources and applications are used together. Mixes of implicit or explicit definitions include the method of allowing a user to invoke a "Save as Project" operation that lists all recently touched or opened resources, including windows and the content they are rendering that is currently being displayed on a user's screen. Such a Save as Project operation can allow a user to add new resources or to remove resources that have been assumed as part of the task.

A system is provided that enables for definitions of persistent "projects," that are comprised by one or more computational and associated display resources, can allow users to open, close, and swap projects. Exploded views can be valuable as regularized processes to clean up and redisplay projects that are revisited—or reconfigured and normalized with an explicit "Clean up project," procedure. Such a procedure may be invoked as a menu item or button. Another application of exploded views is to provide a means for viewing the windows and other resources associated with a project, when such a project is stored for later re-visitation, or is minimized into a small, iconic representation of the multiple windows and other resources associated with the project. Exploded views for tasks or projects also allow easy review of multiple projects by users, when a user may desire to view a list of stored projects. They can also allow for access to a preview of a project in a way that allows them to access a particular portion of the project.

An example task management system (see related discussion at FIG. 24) enables a user to focus one or more full screens of a computer display solely on a single project by swapping, with simple gestures, the project, along with the geometric layout of resources associated with the project, into view and swapping out or minimizing other resources associated with other tasks or projects. One approach to swapping out a task is simply to keep a label for the swapped out task in some visual representation of a list of swapped out or stored tasks. Another approach is to use a richer representation of the project. In one approach, an iconic, smaller view of the windows and other resources displayed in the last view of a project is displayed on the periphery of a screen as a view and access portal onto the project. One sample design enables users to swap a project in by clicking on the small iconic representation of the project, swapping in the project to a complete view, and potentially swapping out the project that had been at focus, into another iconic view at the periphery.

Exploded views can be used to regularize the view on a project when it has been swapped out of focus, making the smaller, iconic view more usable and understandable because of its regularized, familiar properties. When a task is brought back, it can be brought back in its original configuration, or swapped back in as a larger version of the regularized view as a more understandable, more familiar, "cleaned up" starting point. In a refinement of this methodology, a user, who has been switching between two different projects, may desire to have an exploded view as the preferred view on the project when the task is minimized but may desire to have the project represented as it had been last configured geometrically manually when it was at focus, if the project is brought back into focus with some time horizon (e.g., the same day). However, a user may desire to have a means of specifying that, if a project has not been revisited within some time horizon, to have the project brought back in a regularized manner, as a previously specified or parameterized exploded view of the project.

Figure 15:
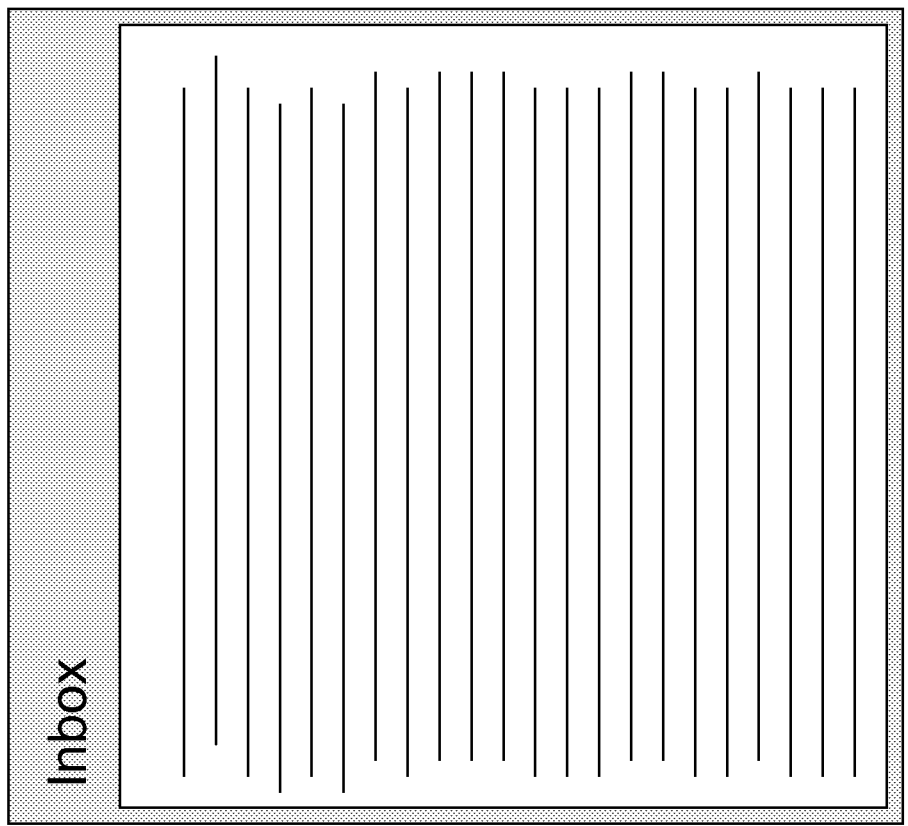
Figure 16:
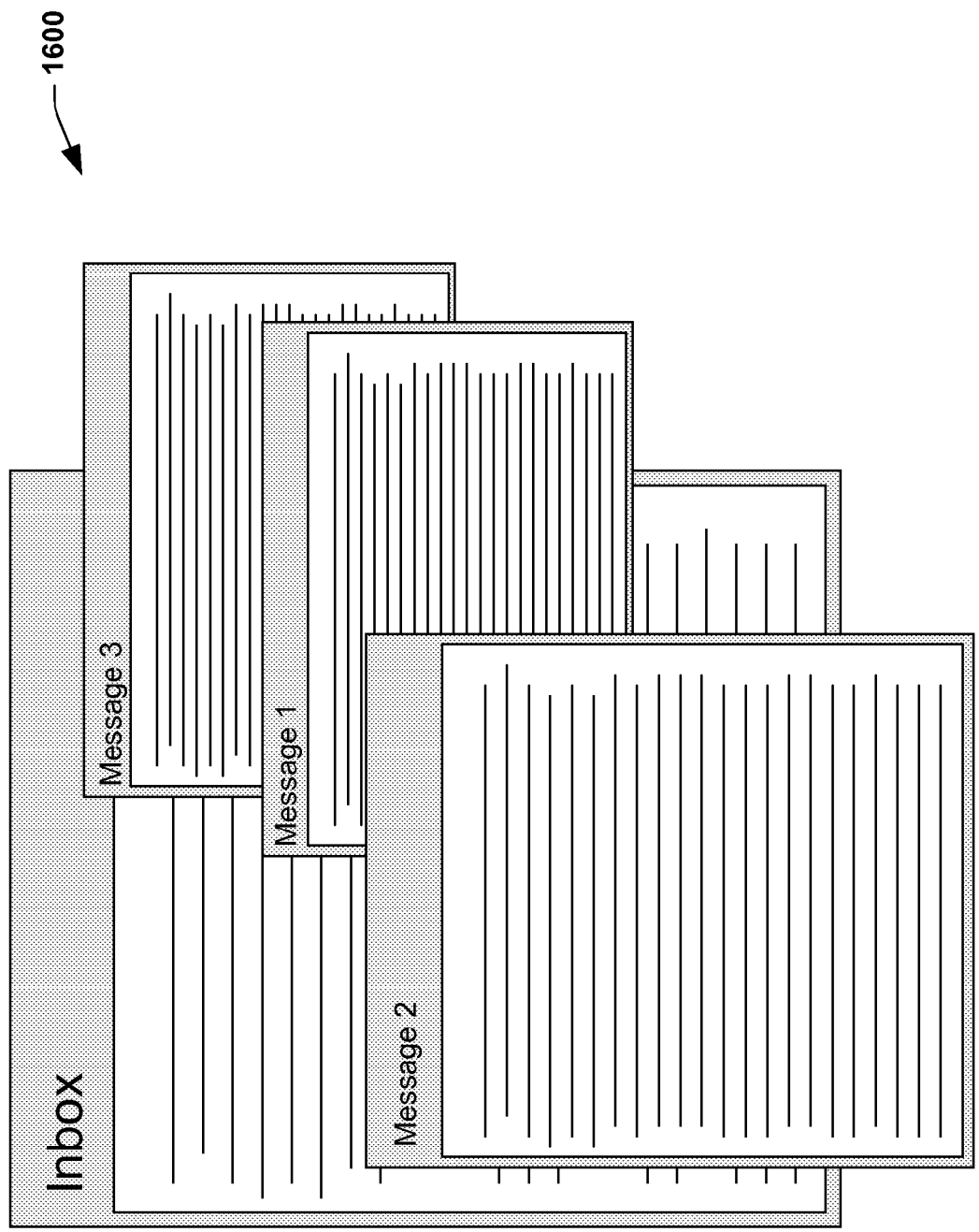

As an example, consider a simple project defined as "working with email." It is noted that more complex projects can be handled in a similar manner. FIGS. 15-21 illustrate the use of exploded views in accordance with an aspect of the present invention, centering on task management and shifting among distinct tasks for the "working with email" example. FIG. 15 illustrates an application in focus such as an email application. FIG. 16 illustrates the display of the application after several messages have been opened in working with the email application displayed in FIG. 15. When the email task is at the focus of attention, the user may be looking at an inbox and opening multiple messages as illustrated in FIG. 16.

Figure 17:
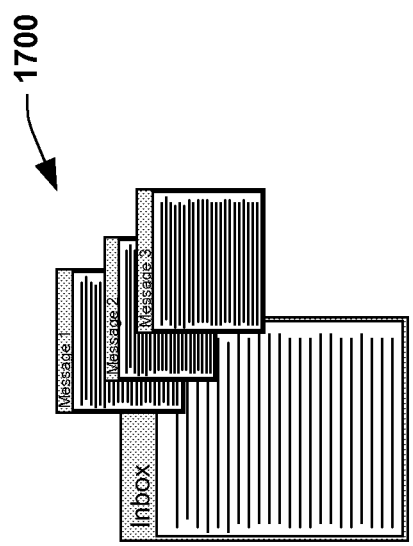

In one approach (e.g., per user set up of preferences regarding the handling of email as a project), the messages are labeled internally per the exploded views analysis to be ordered (Message 1, 2, 3) by the sequence of how they have been opened. When the email task is swapped out, an exploded view is created. An exploded view is automatically positioned to the side of the screen and minimized as illustrated in FIG. 17, per a user's previously specified preferences, in a regularized manner, as the Inbox at center, and to the side, the set of email messages that the user has opened within some time horizon, cascaded neatly to the side of the inbox, in the order that the user had read the messages (or automatically resorted into messages by time or other property like priority of the messages, per user settable preferences).

Figure 18:
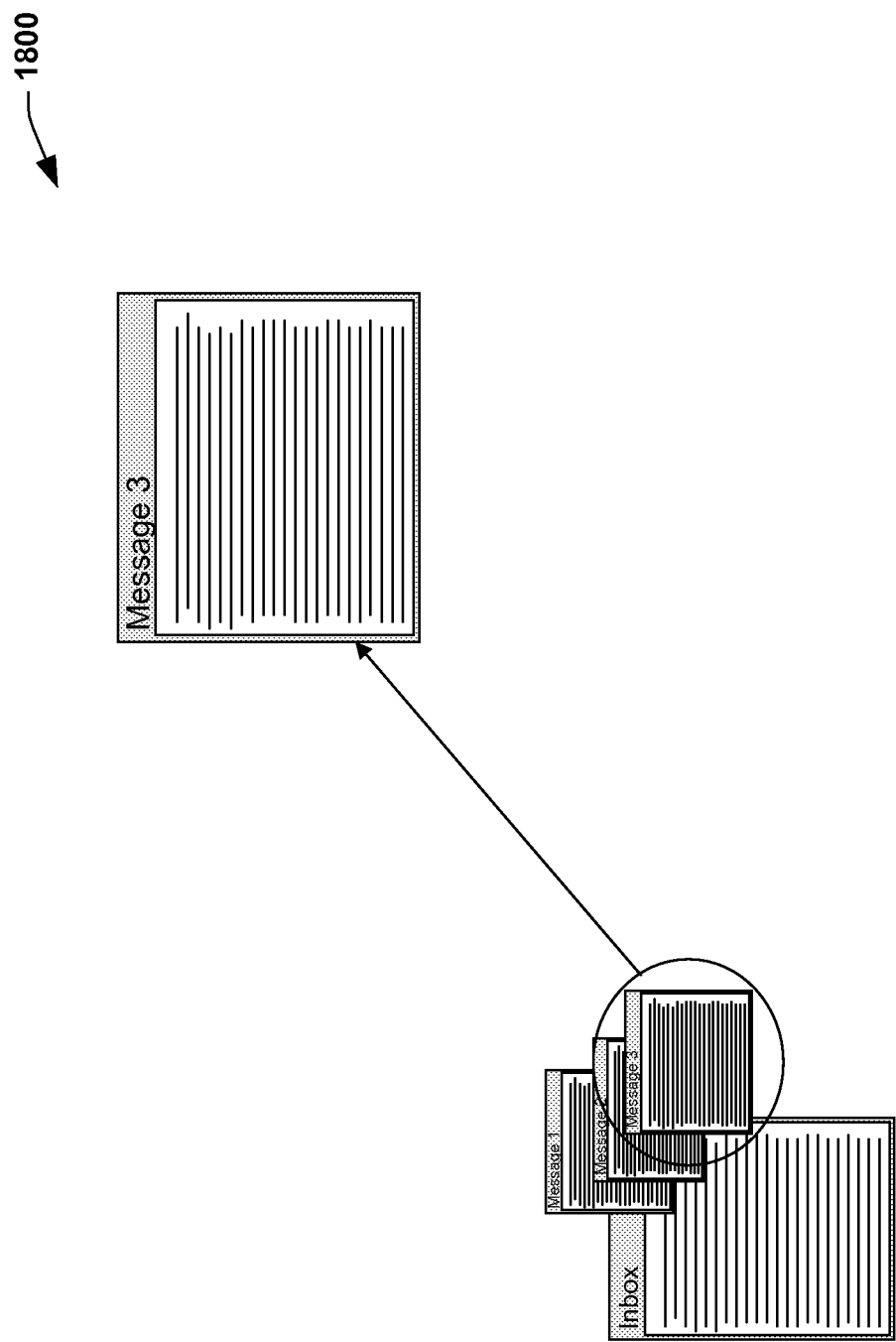
Figure 19:
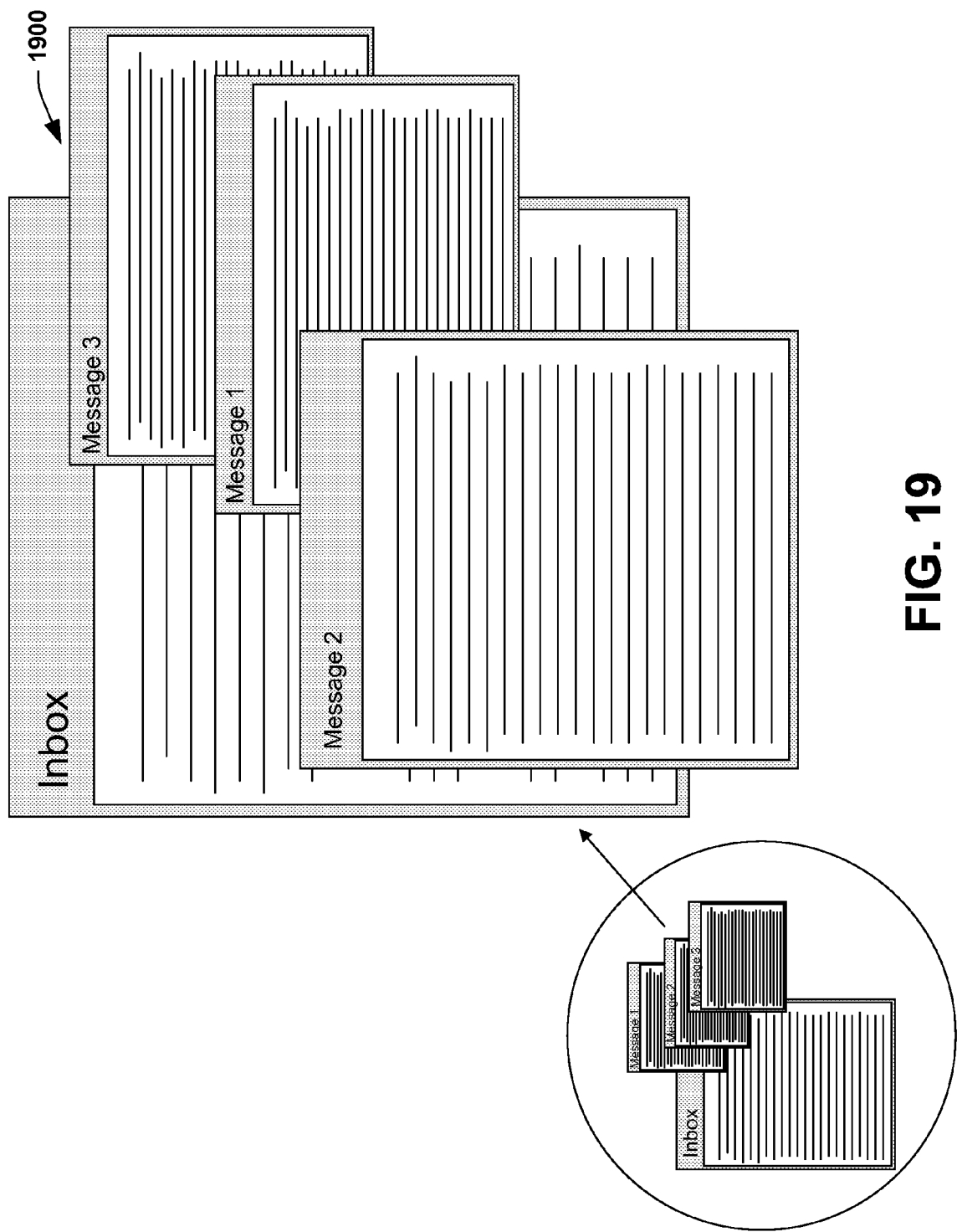
Figure 21:
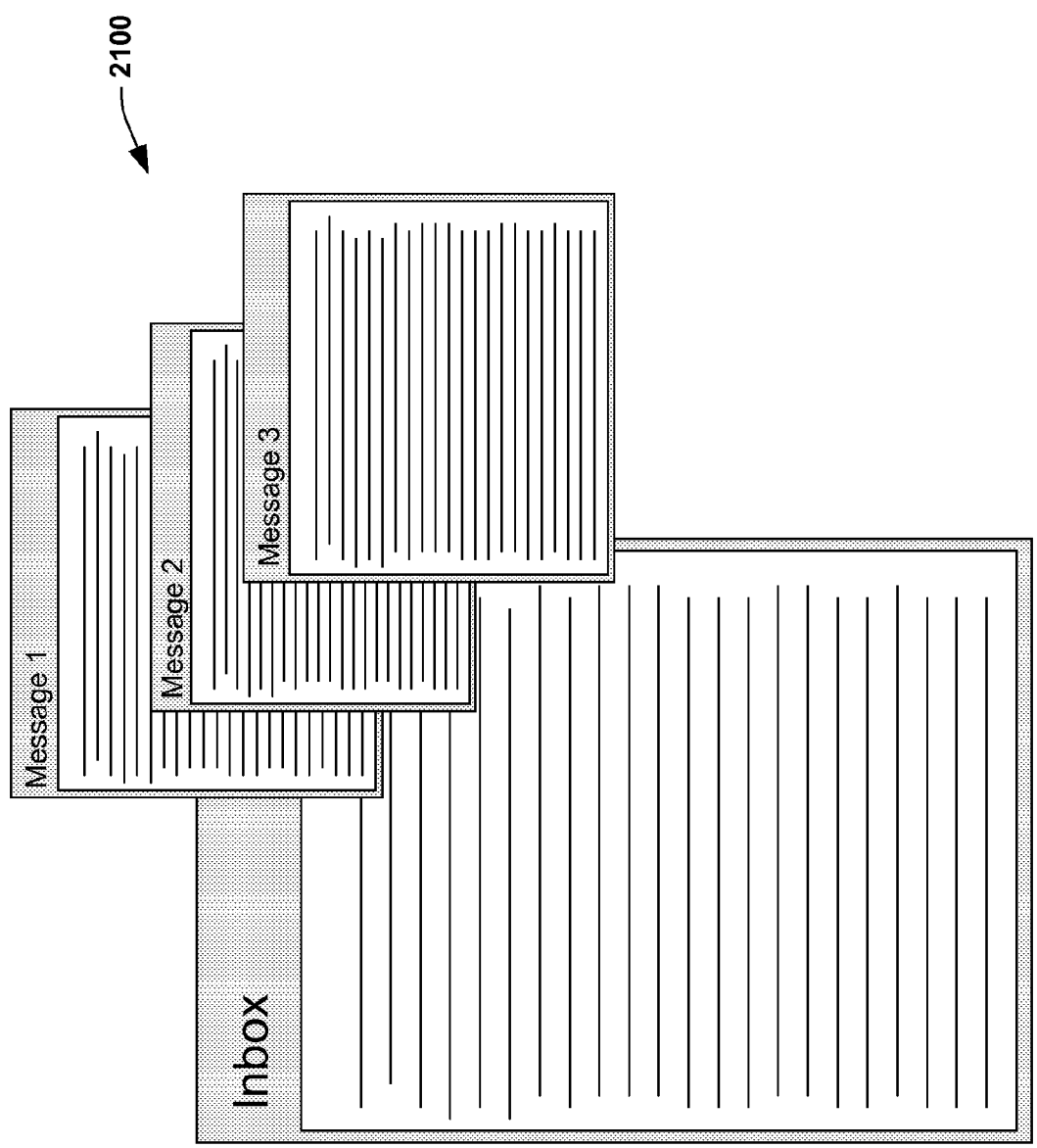

The use of exploded views to portray a visual summary of multiple windows and other resources when a task is out of focus or minimized allows a user to interact with components, e.g., individual messages separately when they are small and to bring to focus particular items, e.g., email messages as illustrated in FIG. 18. Also, when swapping the whole task back into focus, thus maximizing the task as illustrated in FIG. 19, the user may desire to have access to a gesture that will either return the task to the way it was rendered when last at focus or bring back the neater, regularized exploded view as a starting point as illustrated in FIGS. 20 and 21.

Figure 22:
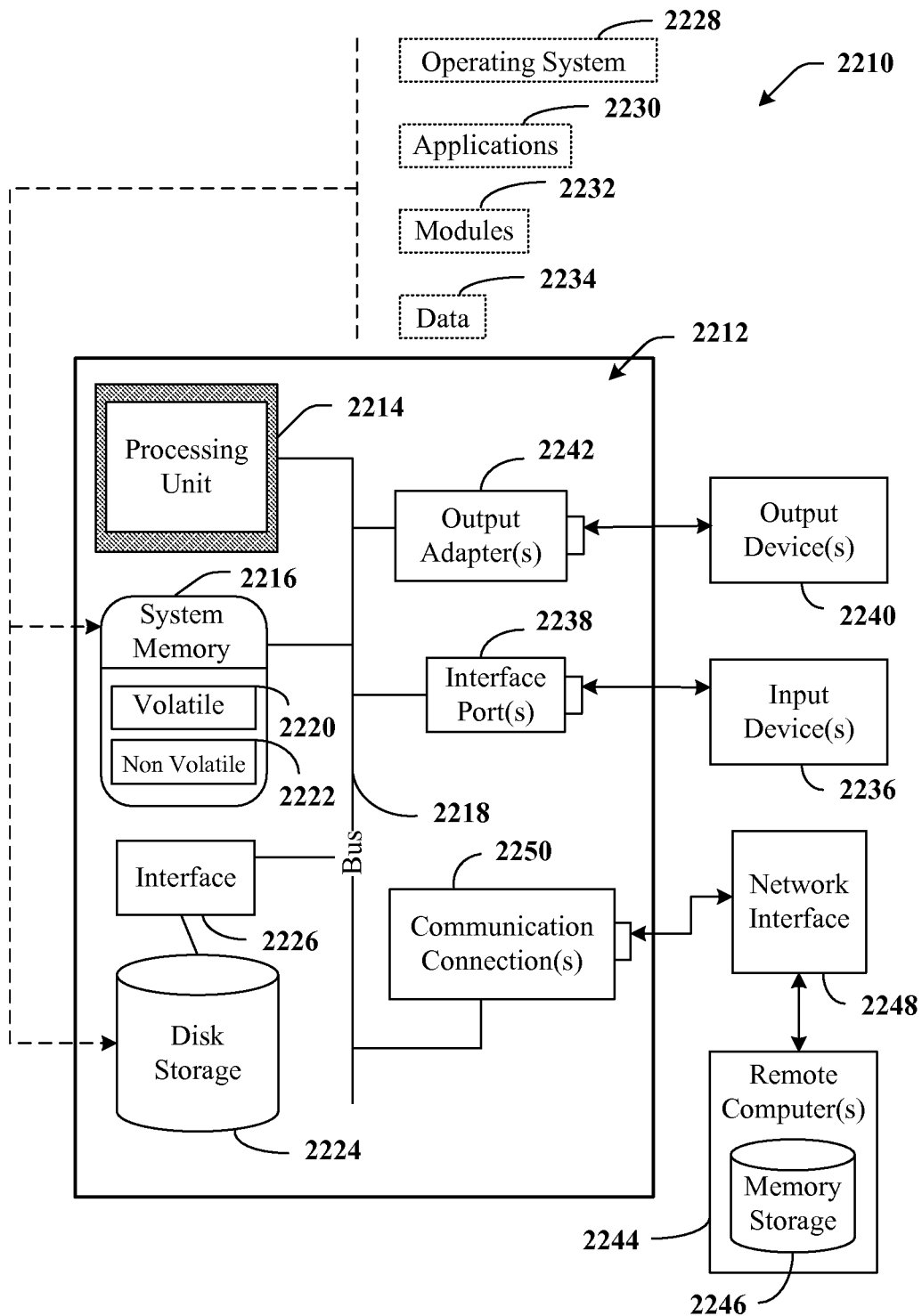
FIG. 22 is a schematic block diagram illustrating a suitable operating environment in accordance with an aspect of the present invention.

With reference to FIG. 22, an exemplary environment 2210 for implementing various aspects of the invention includes a computer 2212. The computer 2212 includes a processing unit 2214, a system memory 2216, and a system bus 2218. The system bus 2218 couples system components including, but not limited to, the system memory 2216 to the processing unit 2214. The processing unit 2214 can be any of various available processors. Dual microprocessors and other multiprocessor architectures also can be employed as the processing unit 2214.

The system bus 2218 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 2216 includes volatile memory 2220 and nonvolatile memory 2222. The basic input/output system (BIOS), containing the basic routines to transfer information between elements within the computer 2212, such as during start-up, is stored in nonvolatile memory 2222. By way of illustration, and not limitation, nonvolatile memory 2222 can include read only memory (ROM), programmable ROM (PROM), electrically programmable ROM (EPROM), electrically erasable ROM (EEPROM), or flash memory. Volatile memory 2220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 2212 also includes removable/non-removable, volatile/non-volatile computer storage media. FIG. 22 illustrates, for example a disk storage 2224. Disk storage 2224 includes, but is not limited to, devices like a magnetic disk drive, floppy disk drive, tape drive, Jaz drive, Zip drive, LS-100 drive, flash memory card, or memory stick. In addition, disk storage 2224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 2224 to the system bus 2218, a removable or non-removable interface is typically used such as interface 2226.

It is to be appreciated that FIG. 22 describes software that acts as an intermediary between users and the basic computer resources described in suitable operating environment 2210. Such software includes an operating system 2228. Operating system 2228, which can be stored on disk storage 2224, acts to control and allocate resources of the computer system 2212. System applications 2230 take advantage of the management of resources by operating system 2228 through program modules 2232 and program data 2234 stored either in system memory 2216 or on disk storage 2224. It is to be appreciated that the present invention can be implemented with various operating systems or combinations of operating systems.

A user enters commands or information into the computer 2212 through input device(s) 2236. Input devices 2236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2214 through the system bus 2218 via interface port(s) 2238. Interface port(s) 2238 include, for example, a serial port, a parallel port, a game port, and a universal serial bus (USB). Output device(s) 2240 use some of the same type of ports as input device(s) 2236. Thus, for example, a USB port may be used to provide input to computer 2212, and to output information from computer 2212 to an output device 2240. Output adapter 2242 is provided to illustrate that there are some output devices 2240 like monitors, speakers, and printers, among other output devices 2240, that require special adapters. The output adapters 2242 include, by way of illustration and not limitation, video and sound cards that provide a means of connection between the output device 2240 and the system bus 2218. It should be noted that other devices and/or systems of devices provide both input and output capabilities such as remote computer(s) 2244.

Computer 2212 can operate in a networked environment using logical connections to one or more remote computers, such as remote computer(s) 2244. The remote computer(s) 2244 can be a personal computer, a server, a router, a network PC, a workstation, a microprocessor based appliance, a peer device or other common network node and the like, and typically includes many or all of the elements described relative to computer 2212. For purposes of brevity, only a memory storage device 2246 is illustrated with remote computer(s) 2244. Remote computer(s) 2244 is logically connected to computer 2212 through a network interface 2248 and then physically connected via communication connection 2250. Network interface 2248 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2250 refers to the hardware/software employed to connect the network interface 2248 to the bus 2218. While communication connection 2250 is shown for illustrative clarity inside computer 2212, it can also be external to computer 2212. The hardware/software necessary for connection to the network interface 2248 includes, for exemplary purposes only, internal and external technologies such as, modems including regular telephone grade modems, cable modems and DSL modems, ISDN adapters, and Ethernet cards.

Figure 23:
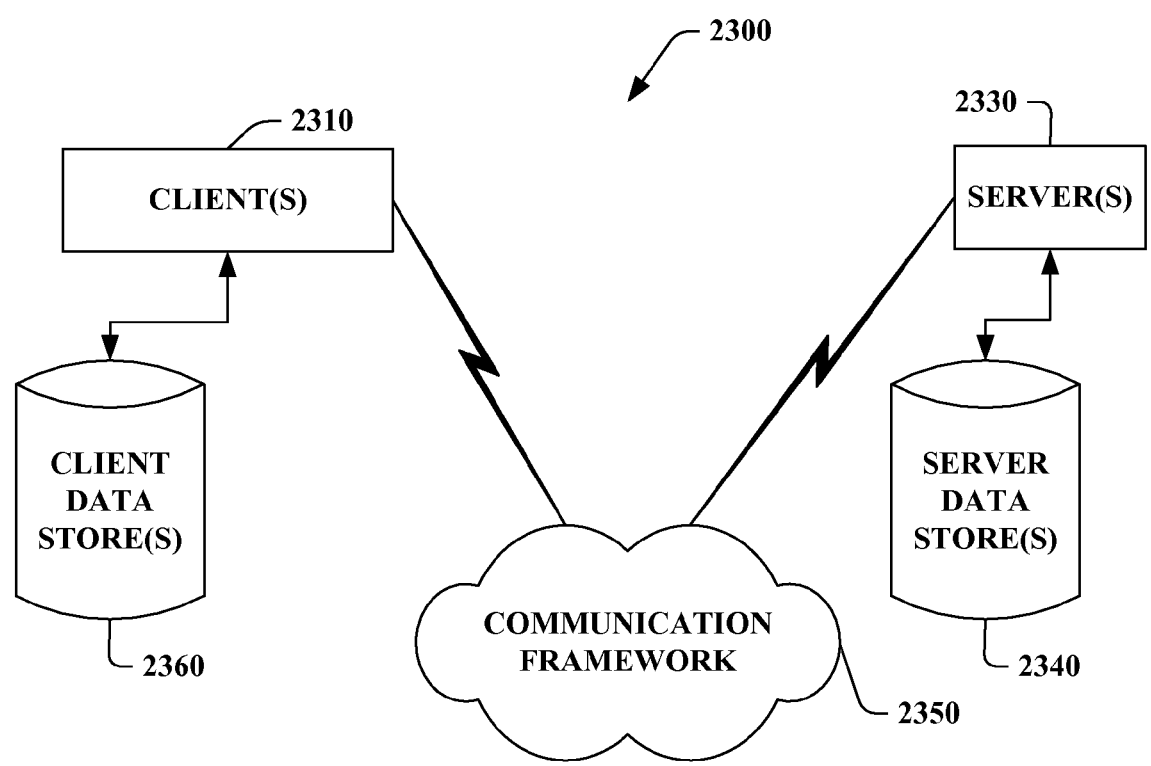
FIG. 23 is a schematic block diagram of a sample-computing environment with which the present invention can interact.

FIG. 23 is a schematic block diagram of a sample-computing environment 2300 with which the present invention can interact. The system 2300 includes one or more client(s) 2310. The client(s) 2310 can be hardware and/or software (e.g., threads, processes, computing devices). The system 2300 also includes one or more server(s) 2330. The server(s) 2330 can also be hardware and/or software (e.g., threads, processes, computing devices). The servers 2330 can house threads to perform transformations by employing the present invention, for example. One possible communication between a client 2310 and a server 2330 may be in the form of a data packet adapted to be transmitted between two or more computer processes. The system 2300 includes a communication framework 2350 that can be employed to facilitate communications between the client(s) 2310 and the server(s) 2330. The client(s) 2310 are operably connected to one or more client data store(s) 2360 that can be employed to store information local to the client(s) 2310. Similarly, the server(s) 2330 are operably connected to one or more server data store(s) 2340 that can be employed to store information local to the servers 2330.

Figure 24:
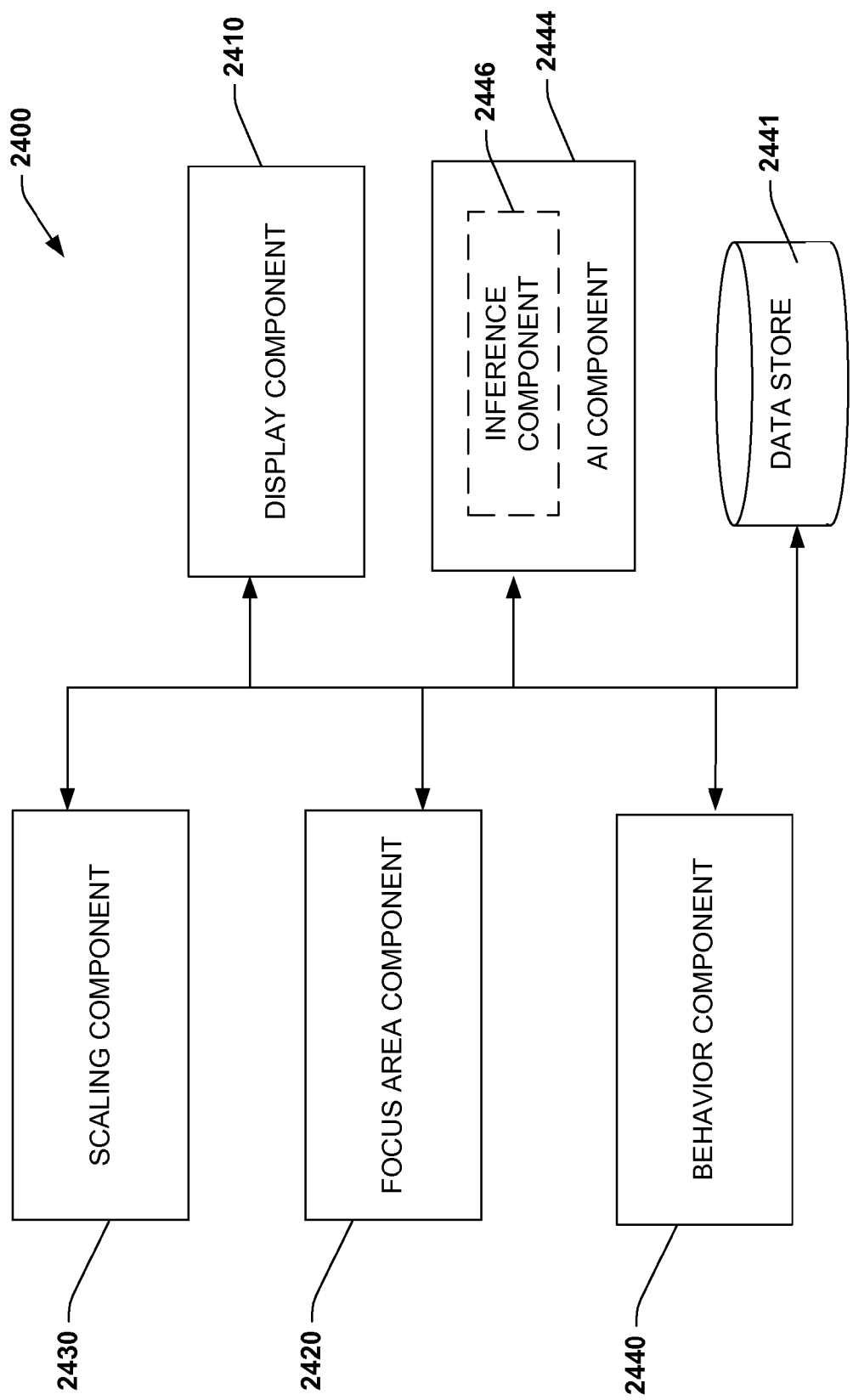
FIG. 24 illustrates an example application in accordance with an aspect of the present invention.

FIG. 24 illustrates an example application in accordance with an aspect of the present invention. FIG. 24 illustrates a schematic representation of an aspect of a system 2400 that facilitates controlling display object behavior in accordance with the subject invention. A display component 2410 effects rendering of display objects on a display space (not shown). The display space is typically a screen in connection with a computing system or device (e.g., desktop computer, laptop computer, personal data assistant, wireless telephone, television, . . . ). The system 2400 further comprises a focus area component 2420, a scaling component 2430 and a behavior component 2440. It is to be appreciated that some or all of these components can be part of a single component and/or comprise a plurality of sub-components to affect various aspects of the subject invention. The focus area component 2420 provides for defining a stable region or focus area. The focus area component 2420 can also define a progressive shrink area which is typically located about an outside periphery of the focus area.

The scaling component 2430 provides for selectively scaling attributes of a display object as a function of location of the display object within the display space. For example, when display object(s) are within the focus area 2460 the display objects are displayed and behave as usual. When display objects are moved outside of the focus area 2460 into the progressive shrink region 2470, the display objects can be reduced in size based on their location, getting smaller as they near an edge of the display surface so that many more objects can remain visible. It is to be appreciated the display object(s) can be moved outside of and into the focus area manually (e.g., via a user employing a mouse), and it is contemplated that display object(s) can be automatically moved outside of and into the focus area by the system 2400. Automatic action (e.g., relocating of objects) can be taken as a function of the system 2400 inferring a user's intentions with respect to manipulating display object(s). With respect to taking automatic action, machine-learning techniques can be implemented to facilitate performing automatic action. Moreover, utility-based analyses (e.g., factoring benefit of taking correct automatic action versus costs of taking incorrect action) can be incorporated into performing the automatic action.

The behavior component 2440 can provide for modifying behavior of display objects in accordance with the subject invention. For example, display object(s) located within the focus area 2460 can behave in a standard manner with full functionality. When display object(s) are located outside of the focus area 2460, functionality associated with the display object(s) can be modified. For example, refresh rates of the display object(s) can be modified as a function of proximity to the focus area 2460 and/or to an edge of the display space. In other words, objects in the periphery can also be modified to have different interaction behavior (e.g., lower refresh rate, static, . . . ) since they may be too small for standard techniques. In addition or alternatively, the objects can fade as they move toward an edge—fading increasing as a function of distance from the focus area and/or use of the object and/or priority of the object.

Beyond smooth manipulation of such aforementioned homogenous graphical properties with moves to the periphery, the subject invention can also facilitate richer notions of compression with the diminishing of size of objects, including compression with selective elision of unimportant components of an object and the selective sizing of multiple components, so as to maximize likelihood that the object would still be recognizable in its reduced formulation. For example, key headings and distinctive figures may be reduced proportionally less than less distinctive objects with the decreasing size of objects. Moreover, the number of display object(s) within the display space as well as within the respective sections (e.g., focus area, and progressive shrink area) can be factored into modifying behavior of the display object(s). The behavior component 2440 can apply any suitable number of and/or combination of metrics (e.g., processing overhead, display space, number of display objects, relative location of display objects, priority associated with respective display objects, time of day, user state . . . ) in connection with modifying display object behavior in accordance with the subject invention.

As noted above, the invention also can provide for object occlusion avoidance within a display area (e.g., focus area, periphery or progressive shrink area)—such aspect of the invention mitigates objects from obscuring one another. An extension of this aspect relates to cluster occlusion avoidance which mitigates clusters from obscuring other clusters as well as mitigating merging (e.g., since clustering can be proximity based) of clusters as a result of moving clusters.

The system 2400 also includes a data store 2441 that can be employed to store information (e.g., historical data, user profile data, display object data, system data, state information, algorithms, databases, display object current and/or previous state data, user current and/or previous state info. multiple user info., task-related data . . . ) in connection with the subject invention.

The system 2400 can optionally include an artificial intelligence (AI) 2444 that can facilitate automatically performing various aspects (e.g., modifying behavior of display object(s), scaling of display object(s), changing size and/or location of focus areas, changing size and/or location of progressive shrink areas, changing geometries of respective focus areas, changing geometries of respective progressive shrink areas, turning on and off functionalities associated with display objects, focus areas, progressive shrink areas, side bars . . . ) of the subject invention as described herein. The AI component can optionally include an inference component that can further enhance automated aspects of the AI component utilizing in part inference based schemes to facilitate inferring intended actions to be performed at a given time and state. The AI-based aspects of the invention can be effected via any suitable machine-learning based technique and/or statistical-based techniques and/or probabilistic-based techniques. For example, the use of expert systems, fuzzy logic, support vector machines, greedy search algorithms, rule-based systems, Bayesian models (e.g., Bayesian networks), neural networks, other non-linear training techniques, data fusion, utility-based analytical systems, systems employing Bayesian models, . . . are contemplated and are intended to fall within the scope of the hereto appended claims.

Although for ease of understanding, only a single focus area, progressive shrink area and display area are shown, it is to be appreciated that multiples of any and all of these areas is contemplated and intended to fall within the scope of the hereto appended claims. For example, more than one focus area can exist with a display space, and locations of such focus areas can be defined as desired. Moreover, functionality of respective focus areas can differ respectively (e.g., so as to optimize multi-tasking). Likewise, multiple progressive shrink areas can be defined, and functionality (e.g., with respect to modifying display object behavior) can be varied as desired.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A data presentation system, comprising:
   a task manager that enables sets of resources and associated displays of content in windows to be defined as a project and manipulated together as the project, wherein the windows can pertain to different applications including text applications, presentation applications, graphics applications, and email applications;
   the task manager further enabling:
      closing of the project such that the resources and associated displays of content in the windows are closed in a first single operation; and
      opening of the project in a second single operation including a re-generation of the windows with the associated displays of content at locations the windows were in before the project was closed;
   a decomposition component that automatically segregates information items into a collection of subcomponents relating to the project; and
   an interface component to render the subcomponents in a graphical manner to facilitate user processing and interaction with the project.

2. The system of claim 1, the interface component provides an exploded view relating to project access.

3. The system of claim 1, the task manager is associated with a task management and recovery system that enables users to define projects with content from one or more applications.

4. The system of claim 3, the tasks or projects are defined implicitly based at least on linking tasks to particular applications.

5. The system of claim 4, further comprising mixes of implicit or explicit definitions that include allowing a user to invoke a "Save as Project" operation that lists recently touched or opened resources, including windows and content rendered that is currently being displayed on a user's screen.

6. The system of claim 1, the task manager includes a Save as Project operation that allows a user to add new resources or to remove resources that have been assumed as part of a task or a project.

7. The system of claim 1, the interface component enables for definitions of persistent projects that include one or more computational and associated display resources, that allow users to open, close, and swap projects.

8. The system of claim 1, the interface component provides an option to clean up and redisplay projects that are revisited—or reconfigured and normalized with an explicit "Clean up project," procedure.

9. The system of claim 1, the interface component including:
   a component for viewing windows and other resources associated with a project, when the project is stored for later re-visitation.

10. The system of claim 1, the interface component provides an exploded view relating to project management.

11. The system of claim 1, the interface component provides an exploded view relating to minimization of information.

12. The system of claim 1, the interface component provides an exploded view relating to progressive shrinking of information.

13. The system of claim 1, the interface component provides an exploded view and a clean-up function for the exploded view.

14. The system of claim 3, the projects are defined explicitly based at least on a project definition procedure via an interface.

15. The system of claim 3, the tasks or projects are defined implicitly based at least on observing which resources and applications are used together.

16. The system of claim 1, the interface component including a component to regularize a view on the project when it has been swapped out of focus.

17. The system of claim 1, the interface component including a component that enables a user to focus one or more full screens of a computer display on a particular project by swapping, with simple gestures, the particular project, along with a geometric layout of resources associated with the particular project, into view and swapping out or minimizing other resources associated with other tasks or projects.

18. The system of claim 1, the interface component including a component for projects that allow review of multiple projects by users, when a user desires to view a list of stored projects.

19. A method comprising:
   defining a project as sets of resources and windows displaying resource content being used together, wherein the windows can pertain to different applications including text applications, presentation applications, graphics applications, and email applications;
   enabling manipulation of the project including:
      closing, in a single closing operation of the project as defined by the sets of resources and the windows displaying the resource content being used together; and
      opening, in a single opening operation of the project, the single opening operation including regenerating the windows displaying the resource content at locations the windows were in before the project was closed;
   automatically segregating information items into a collection of subcomponents relating to the project; and
   rendering the subcomponents as a visual summary in a graphical manner to facilitate user interaction with the project.

20. One or more computer storage devices having computer executable instructions encoded thereon, the computer executable instructions, upon execution by a processor configuring a computer to perform operations comprising:
   defining a project as sets of resources and windows displaying resource content being used together, wherein the windows can pertain to different applications including text applications, presentation applications, graphics applications, and email applications;
   enabling manipulation of the project including:
      closing, in a closing operation of the project as defined by the sets of resources and the windows displaying the resource content being used together; and
      opening, in an opening operation of the project, the opening operation including regenerating the windows displaying the resource content at locations the windows were in before the project was closed;
   automatically segregating information items into a collection of subcomponents relating to the project;
   rendering the subcomponents to facilitate user interaction with the project; and
   presenting, the project as a visual summary in a graphical manner for viewing, when the project is minimized into a small, iconic representation of the windows and other resources associated with the project.

\* \* \* \* \*